United States Patent
Ibar

(10) Patent No.: US 6,210,030 B1
(45) Date of Patent: Apr. 3, 2001

(54) METHOD AND APPARATUS TO CONTROL VISCOSITY OF MOLTEN PLASTICS PRIOR TO A MOLDING OPERATION

(76) Inventor: Jean-Pierre Ibar, 169 Old Church Rd., Greenwich, CT (US) 06830

(*) Notice: Subject to any disclaimer, the term of this patent is extended or adjusted under 35 U.S.C. 154(b) by 0 days.

(21) Appl. No.: 09/333,544

(22) Filed: Jun. 15, 1999

(51) Int. Cl.[7] .......................................... B29B 7/34
(52) U.S. Cl. ..................... 366/78; 366/80; 366/81; 366/91; 366/97; 366/288; 366/289; 366/305; 366/317
(58) Field of Search ........................... 366/78, 97, 79–85, 366/88–91, 100, 190, 285, 286, 288, 305, 307, 75, 315–317, 319, 323, 289

(56) References Cited

U.S. PATENT DOCUMENTS

| | | | |
|---|---|---|---|
| 1,084,210 | * | 1/1914 | Howard . |
| 2,159,670 | * | 5/1939 | Neitke . |
| 2,591,966 | * | 4/1952 | Rider . |
| 2,838,794 | * | 6/1958 | Munger et al. . |
| 2,970,817 | * | 2/1961 | Gurley, Jr. . |
| 3,298,065 | * | 1/1967 | Pendleton . |
| 3,310,837 | * | 3/1967 | Wittrock . |
| 3,333,828 | * | 8/1967 | Boehme . |
| 3,443,798 | * | 5/1969 | Overcashier et al. . |
| 3,671,141 | * | 6/1972 | Kovacs . |
| 4,288,398 | * | 9/1981 | Lemelson . |
| 4,469,649 | * | 9/1984 | Ibar . |
| 4,659,230 | * | 4/1987 | Son et al. ............... 366/81 |
| 4,793,954 | * | 12/1988 | Lee et al. . |
| 4,919,870 | * | 4/1990 | Ibar . |
| 4,925,161 | * | 5/1990 | Allan et al. . |
| 5,088,831 | * | 2/1992 | Reinhall ............... 366/286 |
| 5,129,728 | * | 7/1992 | Winstead ............... 366/79 |
| 5,267,847 | * | 12/1993 | Bohm et al. ............... 366/87 |
| 5,306,129 | * | 4/1994 | Ibar . |
| 5,310,256 | * | 5/1994 | Boden ............... 366/77 |
| 5,344,230 | * | 9/1994 | Kowalczyk et al. ............... 366/100 |
| 5,378,415 | * | 1/1995 | Gohlisch et al. ............... 366/75 |
| 5,674,004 | * | 10/1997 | Takeuchi ............... 366/69 |
| 5,885,495 | * | 3/1999 | Ibar . |
| 5,902,042 | * | 5/1999 | Imaizumi et al. ............... 366/286 |

FOREIGN PATENT DOCUMENTS

842692 * 7/1960 (GB) ............... 366/80

* cited by examiner

Primary Examiner—Charles E. Cooley
(74) Attorney, Agent, or Firm—Notaro & Michalos P.C.

(57) ABSTRACT

An apparatus and method for continuously reducing the viscosity of molten moldable polymeric material uses shear vibration under extensional flow to cause disentanglement. One or more station treatment cavities are defined by a gap composed of two closely separated surfaces in relative motion with each other at given speed and/or submitted to relative oscillations, with given frequency and amplitude to produce a shear deformation on the molten moldable material and a controlled variation of the gap dimension. The surface have a contour profile of ribs and/or bumps and/or grooves over which the molten moldable material can flow and/or can be dragged and/or is being pushed through and/or pumped through. The treatment cavities have an inlet through which the molten moldable material can pass into, and an outlet through which it can exit each treatment cavity.

25 Claims, 13 Drawing Sheets

METHOD AND APPARATUS TO CONTROL VISCOSITY OF MOLTEN PLASTICS PRIOR TO A MOLDING OPERATION

FIELD AND BACKGROUND OF THE INVENTION

The present invention relates in general to molding with polymers, and in particular to a new and useful apparatus for controlling the viscosity of polymeric materials by disentanglement. The invention also pertains to methods of using such an apparatus.

Following is a list of references which is material to the present invention:

[1] J. P. Ibar, ACS Polym. Prep., 21(1), 215 (1980), "Vibro-Molding: A New Process to Mold Polymeric Materials."
[2] J. P. Ibar, Polym—Plast. Technol. Eng., 17(1), 11 (1981)., "Rheomolding: A New Process to Mold Polymeric Materials."
[3] J. Lemelson, U.S. Pat. No. 4,288,398 (1981).
[4] J. W. Pendleton, U.S. Pat. No. 3,298,065 (1965).
[5] P. S. Allen and M. Bevis, U.S. Pat. No. 4,925,161 (1985). Also R. A. Malloy in "Plastic Part Design for Injection Molding", Hanser/Gardner Publications (1993), pp.59, 60.
[6] P. S. Allan et al., *Composites Manufacturing*, The Wolfson Center of Materials Processing, Brunel, The University of West London, Uxbridge, Middlesex, pp. 80–84 (June 1990).
[7a] J. P. Ibar, U.S. Pat. No. 4,469,649 (1984), "Method and Apparatus For Transforming The Physical Characteristics of Material By Controlling The Influence of Rheological Parameters."
[7b] J. P. Ibar, EP Patent 0273830 B1 (1991), "Method and Plant For Fabricating A Product By Injecting Material Into A Mold With Treatment of Injected Material."
[7c] J. P. Ibar, U.S. Pat. No. 4,919,870 (1988), "Process Of and Apparatus For Treating A Shaped Product."
[7d] J. P. Ibar, U.S. patent application Ser. No. 07/880,926 (1993) now U.S. Pat. No. 5,306,129, "Molding Deformable Materials With Use of Vibrating Wall Surfaces."
[7e] J. P. Ibar, abandoned U.S. patent application Ser. No. 08/124,147 (1993), "Molding Apparatus and a Method of Using the Same."
[7f] J. P. Ibar, U.S. patent application Ser. No. 08/138,673 (1993), abandoned "Improved Injection Molding Process and Apparatus."
[7g] J. P. Ibar, Canadian Patent CA 1,313,840 (1993) "Process and Device for Producing an Article by Injection of Material Into a Mold."
[7h] J. P. Ibar, EP Patent No. 0 274 317 (1993), "Process and Device for Extruding a Product in the Form of a Film, Plate, Tube, Bar or Thread."
[8] J. P. Ibar, Modern Plastics, vol. 25 No. 1, 85 (1995).
[9] A. Kikuchi and R. F. Callahan, "Quality improvements Resulting from Rheomolding", SPE ANTEC 1996 Conference Proceedings (CD-ROM), Injection Molding, H4-New Technologies and Developments, Part I.
[10] G. L. Slonimskii, et Al, *Vysokomol.* Soyed; A16, 1, 2342 (1974).
[11] S. N. Nurmukhametov, et Al, *Mekhanika Polimerov;* No. 4, 579 (1976).
[12] J. Casulli, J. R. Clermont, A. Vonziegler and B. Mena, "The Oscillating Die: *A Useful Concept in Polymer Extrusion*" Polym. Eng. Sci.; 30 (23), 1551 (1990).
[13] C. M. Wong, C. H. Chen and A. I. Isayev, "Flow of Thermoplastics in an *Annular Die under Parallel Oscillations*", Polym. Eng. Sci.; 30 (24), 1574 (1990).
[14] B. Mena, O. Manero and D. M. Binding, "*Complex Flow of Visco-elastic Fluids through Oscillating Pipes: Interesting Effects and Applications*", J. of Non-Newtonian Fluids Mechanics; 5, 427 (1979).
[15] B. Mena, O. Manero and D. M. Binding, Rheol. Acta; 16, 573 (1977).
[16] B. Mena, O. Manero and D. M. Binding, Rheol. Acta; 17, 693 (1978).
[17] L. R. Shmidt and J. L. Maxam, "Injection Molding Polycarbonate Compact Disks: Relationship between Process Conditions, Birefringence and Block Error Rate", SPE ANTEC 1988 Technical Papers, 34, 334 (1998).
[18] L. R. Shmidt and J. L. Maxam, "Injection Molding of Polycarbonate Optical Disks Using an Oscillatory Boundary Condition", SPE ANTEC 1992 Technical Papers, 38, 447 (1992).
[19] H. A. Hengesbach, K. W. Schramm, D. Woben, R. Sarholz, "Ausrustung von Spritzgiessmaschinen (Equipping of Injection Molding Machines), Report II-1 from IKV, at the Rhineland-Westphalian Technical University (RWTH) in Aachen (1976).
[20] K. W. Schramm, "Injection Molding of Structural Parts Consisting of Plastic Molding Materials Utilizing Forced Oscillating Flow Processes", Doctor-Engineer Thesis, Rhenish-Westphalian College of Technology (1976).
[21] Lee, U.S. Pat. No. 4,793,954.
[22] J. P. Ibar, "Melt Viscosity Reduction of Plastics by Vibration during Filling in Injection Molding.", ANTEC 1997, Toronto, SPE Reprints (1997).
[23] J. P. Ibar, "Smart Processing of Plastics Through Vibration Controlled Shear Thinning and Orientation", 1997 ASME International Mechanical Engineering Congress and Exposition. Reprint MD-Vol. 79, pp 223–348, 1997.
[24] J. P. Ibar, U.S. Pat. No. 5,885,495.
[25] J. P. Ibar, "Control of Viscosity of Polymer Melts Prior to Molding by Disentanglement Methods", ANTEC 99 Conference Proceedings, Volume II, 1900 (1999).
[26] L. A. Utracki, NATO/ASI Advanced Study Institute, *Development in Processing for Polymer Property Enhancement*, Caminha, Portugal, May 17–28 1999.
[27] J. D. Ferry, "Viscoelastic Properties of Polymers", Appendix C, page 640, Second Edition, John Wiley & Sons, NY. Library of Congress Catalog Card#: 76-93301.

BACKGROUND OF THE INVENTION

It is well known to those skilled in molding polymeric materials that the processing parameters (e.g. temperatures, pressures, flow rates, flow length etc.) are a direct consequence of the viscosity of the melt which is governed by the state of entanglements of the macromolecules. The resin "melt index" usually characterizes the fluidity of the melt and can be used to specify a certain resin grade suitable for a given molding application. The melt index is a function of the molecular weight of the macromolecular chains and their degree of entanglement. A high melt index corresponds to a high flow resin. The mechanical performance of a molded product is also a strong function of its molecular weight characteristics, the longer the macromolecular chains the stronger and stiffer the final article. Unfortunately the high strength required of plastics during their usage often results in a lack of fluidity during the molding operation, with as a result, high operational molding costs and molding defects (weld lines, sink marks etc.). One accepted practice which is designed to compensate for this lack of control of melt fluidity includes decreasing the molecular weight of the macromolecules being molded. Although this decreases the viscosity, improving the flow length significantly, it often results in a reduction of the mechanical properties, in particular strength and stiffness. Moreover, this practice cannot be used in those instances wherein the final molded product has to be very small and/or thin, such as in thin-wall injection molding applications.

In summary, the resin suppliers have succeeded in providing the plastic industry with means to lower the viscosity to ease up processing or increase melt elasticity by blending grades of different molecular weights. The problem with that solution is that the mechanical performance of the lower molecular weight polymers is also severely reduced, a compromise for better processability which processors have to pay.

The industry would welcome a process which allows the decrease of viscosity of plastic melts without the need to change the molecular weight of the resins, with the added advantage of a reduction of the number of grades a resin manufacturer has to offer.

Shear thinning of plastic materials is well known and is used practically to lower the viscosity of melts during the filling stage of injection molding by increasing the speed of the injecting piston. This is particularly useful in the case of thin wall injection molding where considerable forces are required to fill the mold when the viscosity of the melt remains quasi-Newtonian.

It is also well known that shear thinning can be obtained, at a given temperature, by either increasing the shear rate or the frequency of oscillation of the melt at constant amplitude of oscillation. In particular, it is well known that the viscosity of a plastic melt can be reduced by shear thinning induced by vibration [21,22,23].

Shear thinning does not invoke the same mechanism of viscosity reduction than what is required to produce long term viscosity reduction by disentanglement [24,25,26]. Shear thinning results from the elastic cooperativity of the network of interactions between parts of the macromolecules called conformers. The viscosity reduction is instantaneous and only prevails under vibration, i.e. it ceases if the vibration ceases. In other words, the viscosity reduction induced by shear thinning is not preserved and the melt is unaltered after the vibration ceases: after the melt oscillation has stopped, its Newtonian viscosity remains the same as for the initial-non vibrated melt. Therefore, the viscosity reduction induced by vibration-shear thinning is completely unstable and requires to be done while the material is injected or extruded, that is to say while the part is being shaped in a mold or a dye. This implies the implementation of sophisticated vibration machinery added to traditional injection molding, blow molding or extrusion machines. Examples of such devices are described in other patents [20,22,23].

In short, the use of vibration means to increase flow and modify in situ the viscosity of melts is well known. However, in order to clearly distinguish the differences between the present invention, which also uses vibration means to reduce viscosity, and the prior art, the prior art is summarized as follows:

There are three categories of patented processes using vibration to modify the molding process and/or the properties of molded materials:

1. The common practical feature among the patents of the first category is their use of mechanical shaking/oscillation or ultrasonic vibration devices to homogenize and increase the density of the material molded, either in the liquid stage or in the solidifying stage, either at a macroscopic or microscopic level [3-6]. These patents do not directly concern the use of vibration to lower the viscosity of a melt to increase their processability during conversion, nor do they address the use of packing vibration to increase the melt elasticity.

2. The second category of patents and processes using vibration is based on the fact that material rheology is a function of vibration frequency and amplitude in addition to temperature and pressure. This can be put to practical use to influence diffusion and rate sensitive processes which depend on viscosity and relaxation kinetics, such as nucleation and growth of crystals, blending and orientation [1-2, 7-11]. However, as said earlier, these patents do not alter the viscosity of the melts in a way which preserves the viscosity reduction, and, the alteration is entirely dependent on the activation of the vibration means which create it, while the melt is cooled and vibrated. This is the case for Lee's patented invention [21]. Lee [21] describes an application of shear ultrasonic vibration to a plastic melt in order to lower viscosity by shear thinning for improving processability. Shear thinning does not invoke the same mechanism of viscosity reduction than what is described in the present invention. Shear thinning results from the elastic cooperativity of the network of interactions between parts of the macromolecules called conformers. When vibration ceases, the cooperativity ceases and the viscosity reduction is spontaneously reversed.

Lee's patent teaches a technique of shear thinning working in the ultra-sonic range. Lee's patent affects shear thinning and does not induce changes in melt viscosity when the vibration is stopped. The frequency used is much too high to produce any disentanglement effects, as required in the present invention. Furthermore, in Lee's invention, the amplitude of an ultrasonic excitation is of the order of micron or tenths of a micron, which is much too low for disentanglement to occur. It is uncapable of mechanically pulling macromolecules apart and does not produce disentanglements. Lee's invention does not require an induction time for melt viscosity to occur in a way which affects the post vibratory viscosity. One clearly sees that the conditions of vibration used in the present invention and in inventions based on shear-thinning, such as described in [21], are totally different. This is simply because they do not address the same physical phenomenon.

3. In a third category, vibration is essentially used to generate heat locally by internal friction [20] or to decrease surface stresses at the wall interface between the melt and the barrel or the die to increase throughputs [12-16, 17-20]. The heat generated locally by pressure pulsation can be significant enough, in injection molding, as to avoid the premature freezing of the gate, resulting in a significant reduction of the shrinkage in the final part [20]. The significant reduction at the wall interface of the friction coefficient increases the throughput of melt flow through vibrating dies [12-16] and reduces orientational birefringence. These processes do not try to modify the viscosity of the melt per se, in a way which would be similar to a reduction of the molecular weight average of the macromolecules.

The industry would welcome a process which allows the viscosity to be significantly reduced and stayed reduced, at least for the time it is processed into a shaped article, without altering the molecular weight of the polymer and the inevitable degradation of the mechanical characteristics that results from it. Likewise, the industry would welcome a process which allows the melt elasticity to be significantly increased and stayed increased, at least for the time it is processed into a shaped article, by blow-molding or thermoforming, without the need to increase the molecular weight of the polymer and the creation of a new grade for this resin, with the inevitable costs associated with the promotion and the manufacturing of such a new grade.

In short, the industry would welcome a non-chemical process allowing the simplification of their resin line without the need to modify the processability and melt strength by varying the molecular weight average and the polydispersity of the resin into various grades.

In view of the above, the polymer molding industry would greatly welcome an apparatus and/or method which decreases the viscosity of macromolecules without changing their mechanical performance. Such a process [24] is described in U.S. Pat. No. 5,885,495 and also in References [25, 26], and consists in controlling the degree of entanglement to reduce viscosity in an operation taking place prior to molding.

U.S. Pat. No. 5,885,495 teaches how to disentangle the macromolecules of the melt by a method of shear vibration and melt fatigue under extensional flow, which, like shear thinning, requires the implementation of vibration, but not for the same reasons, nor to produce the same effects.

In U.S. Pat. No. 5,885,495 the macromolecules are pulled apart to produce the disentanglement effect which is responsable for the lowering of viscosity. The viscosity remains lower after the treatment, at least for some time, which allows to either transport the treated melt to a die or mold, or to pelletize it, which freezes the disentangled state. This is quite different from shear-thinning effects, which do not allow the same advantages. As already pointed out before, shear-thinning must be coexistent with the molding operation in order to produce a viscosity reduction. If and when the vibration ceases, the viscosity immediately recovers its initial high value, which corresponds to the Newtonian state. In fact, in the prior art methods to reduce viscosity based on shear-thinning, if the totality of the mold or die is not vibrated, only the part of the melt which is vibrated demonstrates local shear-thinning advantages. Viscosity reduction occurs where vibration is sustained, but if vibration ceases, so does the viscosity reduction. This is obviously a serious draw back of prior art, as noted in U.S. Pat. No. 5,885,495.

As shown in references [24] for Polycarbonate and [25, 26] for a metallocene Polyethylene, after viscosity reduction by disentanglement has occured, it takes a relatively long time for the entanglements to reform again, which results in the restoration of the viscosity at the corresponding temperature. This time is of the order of 10 minutes at elevated temperatures for Polycarbonate [24], without the effect of pressure on the kinetics. During these 10 minutes the molten resin continues to have a much reduced viscosity (although increasing in time). It can be pumped away from the treatment location and benefit from the viscosity reduction advantages. If it were desirable to do so, the disentangled plastic melts could be submitted to shear thinning according to prior art methods [21,22,23] for further decrease of viscosity during processing.

It is well known that the viscosity of macromolecules below the so-called critical molecular weight varies proportionaly to molecular weight, whereas, due to entanglements, viscosity varies like the power 3.4 of molecular weight above the critical molecular weight Mc. Therefore, the large increase of viscosity of polymeric melts is due to the entanglements of the macromolecules. completely disentangled polymers, at identical molecular weight, would have a much lower viscosity, proportional to M, where M is the average molecular weight. In theory, the maximum viscosity reduction which could occur through a disentanglement method is (M/Mc) 2.4.

As it becomes evident by reading U.S. Pat. No. 5,885,495 disclosure, none of the inventions described in the prior art describe a method and apparatus capable of modifying and controlling in a significant way the viscosity and the elasticity of plastics without the need to either modify the molecular weight of the macromolecules or the addition of plasticizers, lubricants etc.

The present invention describes a novel apparatus and methods to apply industrially the disentanglement process taught in U.S. Pat. No. 5,885,495 taking into account manufacturing concerns such as throughput optimization, energy consumption and other economical factors. The industry would greatly welcome high throughput disentanglement processing apparatus capable of producing continuously and economically reduced viscosity resins from high strength high molecular weight grades. Moreover, it would be an even more welcomed improvement if such a molding apparatus and/or method would not result in significantly increasing the cost per pound of treated resin unnecessarily.

The difference between U.S. Pat. No. 5,885,495 and the present patent application is that the present application discloses specific methods and apparatus in which to apply a shear oscillation under extensional fatigue conditions to produce continuously and economically disentangled melts of various degree of disentanglement. U.S. Pat. No. 5,885,495 teaches how to determine the disentanglement processing window and warns against the possibility of slippage at the wall at high yield which can be detrimental to the success and/or efficiency of the viscosity control invention. In the present invention, because of the presence of ribs/bumps and grooves on the moving surfaces in contact with the molten moldable material, the conditions required to condition the melt for disentanglement are less strenuous, in particular with respect to the frequency and amplitude of shear vibration. The consequences are two folds: (a) it is possible to obtain disentanglement effects for less energy per pound treated and the chances of slippage at the wall are reduced; (b) one can utilize the less demanding processing margin to increase productivity by operating at the limit of feasibility for those disentanglement conditions.

SUMMARY OF THE INVENTION

The present invention overcomes the prior art problems and shortcomings in a method and apparatus which produce a novel product wherein extensional shear vibration is exercised on a molten plastic as it is continuously extruded to pass through treatment stations at determined temperature, frequency and amplitude of vibration, during a certain time and under specific vibrating conditions for each station, to obtain a controlled progressive decrease of the entanglements between the macromolecules, in order to significantly and controllably decrease the viscosity of the extruded melt in a manner which can be beneficial a to future molding operations requiring a lower melt viscosity.

A method and apparatus are disclosed for decreasing in a continuous way the viscosity of molten polymers, such as a metallocene polyethylene or polycarbonate, prior to a molding operation such as injection molding, extrusion, thermoforming, blow molding or compounding. When a significant reduction of viscosity is desirable, the plastic melt is submitted to the action of a specific mechanical extensional shear vibration, with minimum or no external pressure, within a specific range of amplitude and frequency of melt oscillation to cause the melt to become highly elastic, and simultaneously to be fatigued in extensional flow conditions for a certain time, maintaining this high elastic state, until the macromolecules have partially or totally disentangled, in a controllable manner, at which stage the melt is ready for a molding operation such as a simple quenching operation or an extrusion process followed by quenching to produce pellets or compounds with a better mix or a lower viscosity when remelted, or an injection molding or similar molding operation where the melt viscosity has been greatly reduced allowing a better processability of the injected part, for instance allowing the use of a lower temperature of injection, a lower pressure of injection or both.

Accordingly, one object of this invention is to provide a molding apparatus and/or method which can reduce the viscosity of melt in a given controllable degree by disentanglement of the macromolecules while the resin is in the melt.

Another object of this invention is to provide a molding apparatus and/or method which can continuously produce reduced viscosity resins which can be either stored and bagged as special low melt viscosity producing pellets or pumped to another molding site for immediate use.

These and other objects are achieved through the advent of a novel apparatus and/or a method of using the same. The novel apparatus includes, among other things, at least one station which defines a cavity, the treatment cavity, wherein a molten moldable material can pass into and/or flow through it to be treated to produce at least partially disentangled melts according to the process described in U.S. Pat. No. 5,885,495. This station has an inlet conduit through which molten, moldable material can pass into the treatment cavity, and an outlet conduit through which molten, moldable material can pass out from the treatment cavity to either a pumping station, another treatment station, or an accumulator.

The apparatus also includes at least one feeder for preparing a molten, moldable material. This feeder includes a means for expelling the molten, moldable material through its outlet into the station treatment cavity.

The apparatus also includes at least one accumulator for collecting the treated molten, moldable material before it is sent to either a pelletizer system or to a pumping station.

The treatment station includes means for exerting a shear vibration of given frequency and amplitude coupled with fatigue extensional flow on the molten, moldable material contained within the treatment cavity.

The treatment station includes means for varying the amplitude of the shear vibration applied on the molten moldable material as it flows through from the inlet to the outlet of the treatment station.

The treatment station includes means for exerting a shear drag at given strain rate of the molten moldable material as it flows through from the inlet to the outlet of the treatment station.

The treatment station includes means for exerting a variation of the shear strain rate of the molten moldable material as it flows through from the inlet to the outlet of the treatment station such that it produces extensional acceleration/deceleration of the flow.

Also included in this apparatus are means to continuously push and/or drag and/or pump the melt located in the station treatment cavity from the inlet conduit towards its outlet conduit.

Also included in this apparatus are means to vary the gap which the molten, moldable material can pass and/or flow through.

Also included in the apparatus are means to continuously vent the treatment cavity to prevent the formation of bubbles or cavitation during the treatment.

The apparatus also includes a means for monitoring and controlling the temperature of the molten moldable material contained within the feeder(s), the treatment cavity(s) and/or the pumping station(s).

The apparatus also includes a means for monitoring and controlling the pressure of the molten moldable material contained within the feeder(s), the treatment cavity(s) and/or the pumping station(s).

The apparatus also includes a means for monitoring and controlling the torque exerted on the molten moldable material contained within the treatment cavity(s).

Other objects, aspects and advantages of the present invention will be apparent to those skilled in the art upon reading the specification and the appended claims which follow.

A more complete appreciation of the present invention, and many of the attendant advantages thereof, will be readily ascertained as the invention becomes better understood by reference to the following detailed description, when considered in connection with the accompanying figures briefly described below.

The various features of novelty which characterize the invention, are pointed out with particularity in the claims annexed to, and forming a part of this disclosure. For a better understanding of the invention, its operating advantages and specific objects attained by its uses, reference is made to the accompanying drawings and descriptive matter, in which preferred embodiments of the invention are illustrated.

BRIEF DESCRIPTION OF THE DRAWINGS

FIG. 2A is a schematic illustration of one embodiment of a disentanglement apparatus designed in accordance with the present invention having a single feeder and a single treatment cavity, wherein the shear vibration under extensional flow is produced by feeding a molten moldable material through a gap composed of at least one rotating and/or oscillating surface presenting on its contour a profile over which the molten material flows and/or can be dragged and/or is being pushed through and/or pumped through.

FIG. 3 is a schematic illustration of one embodiment of a disentanglement apparatus designed in accordance with the present invention having a single feeder and more than one treatment cavity, separated by a pumping section, wherein the shear vibration under extensional flow in the treatment cavity section is produced by feeding a molten moldable material through a gap composed of at least one rotating and/or oscillating surface presenting on its contour a profile over which the molten material flows and/or can be dragged and/or is being pushed through and/or pumped through.

FIGS. 15A to 15C define some of the shape parameters and the angle of tilt. The contours of the ribs are calculated to eliminate any possibility of turbulence or other non linear defect in the flow, which should remain laminar. The height of the rib, e, the width of the ribs, w, the radius R1, R2 and R3 which define the curvature to accelerate (R1) or decelerate (R3) the flow, can be different along cross sections aa and bb (the cross section bb is not shown here). The strain rate vector decomposes into two components, which defines two directions of drag flow. The shape of the ribs along each axis aa or bb is determined by the strain rate profile desired in these directions. Both profiles can be used to define conditions of shear vibration and/or extensional fatigue which can couple up to optimize disentanglement effects.

DESCRIPTION OF THE PREFERRED EMBODIMENTS

Figure 1A:
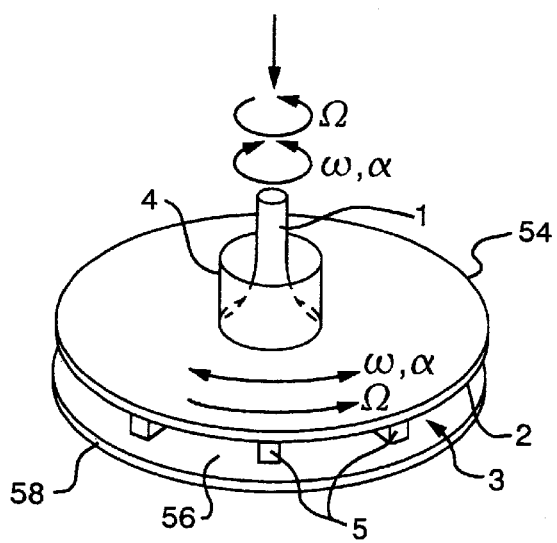
FIGS. 1A, 1B, 1C, 1D, 1E and 1F are schematic illustrations of embodiments of a disentanglement apparatus designed in accordance with the present invention having a single feeder and a single treatment cavity, wherein the shear vibration under extensional flow is produced by rotating at constant speed and/or at modulated speed and/or by pure oscillation an incoming melt which flows outwards over ribs disposed on at least one surface.
Figure 1B:
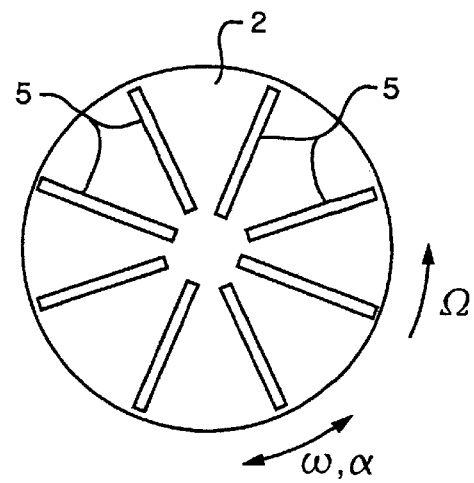

The present invention pertains to apparatuses for reducing the viscosity of moldable materials (e.g., polymers) through disentanglement processes. It also pertains to methods of using such apparatuses.

The apparatus encompassed by the present invention includes at least one slit cavity, the treatment cavity, where molten moldable material flows through under conditions where shear vibration under extensional flow takes place to enable disentanglement to occur. The apparatus is not limited to any specific cavity design or configuration, provided laminar flow without turbulence or cavitation prevails. For instance, the cavity can have a constant gap or a variable gap. The cavity can have sections of constant gap followed by sections of variable gaps. The gap cross section dimensions at any given point of the flow path determine the strain and strain rate of deformation on the molten moldable material at that point. Examples of calculation of strain and strain rate as a function of gap geometry can be found in Ref. 27. For an annulus (circular slit), the gap cross-section is determined by the radius and height of the gap. Pressure drop, shear stress at the wall and flow rate are a strong function of melt viscosity which varies with strain rate, temperature and gap profile. In summary, the gap profile is crucial not only to determine the extent of flow, i.e. the throughput, but also to implement a certain type of flow. For instance, a gap convergence creates an acceleration of flow, and its extension. Conversely, a gap divergence translates into a deceleration and a contraction of flow. Obviously, a succession of restriction and enlargement of the gap, in the pathway of a flowing molten moldable material, results in a periodic variation of the strain rate from acceleration to deceleration, and of the strain from extension to contraction. If ribs are regularly disposed on at least one surface in contact with a melt flowing in the gap created by two adjacent surfaces, a periodic shear oscillation under extensional flow is created which, according to the present invention, can be set to produce disentanglement effects, using operating conditions of strain rate and strain taught in U.S. Pat. No. 5,885,495. Upon reading this specification, those skilled in the art will know what types of slit geometry and configuration can be used when practicing the invention. For instance, the disentanglement treatment cavity can be an extrusion barrel/screw die modified to incorporate the features capable of bringing the melt in the processing window region required by U.S. Pat. No. 5,885,495 to produce disentanglement. This can be done by re-designing the screw profile and the gap between the barrel and the screw and by adding specifically designed ribs and/or grooves on both the inside surface of the barrel and on the screw. The modified screw rotates inside the close fitting barrel, shearing the molten moldable material over the profiled gap. A multiple screw treatment cavity can be built wherein the screw flights intermesh. When it is the case, the action of the intermeshed screw is, in addition to producing a vibrational flow under extension, to move forward the molten moldable material due to positive displacement, in a way somewhat similar to that of a gear pump. Single screw cavity and nonintermeshing multiple screw disentanglement cavities lack this positive displacement, but the ribs and grooves can be spaced and positioned with respect to the rotation motion such that a longitudinal strain rate is added to that caused by pressure flow. Upon reading this specification, those skilled in the art will know what types of ribs and grooves can be added to an extrusion barrel and screw dies in order to practice the invention and create a pumping effect at the same time.

The preferred treatment cavity design will depend, in part, upon the nature of the resin to be disentangled, the throughput desired and the resources available to the practitioner of the invention. For instance, if enough resources are available, an apparatus comprising multi disentanglement stations is desirable wherein each individual station is set to optimize throughput, not disentanglement efficiency, but viscosity reduction is compounded at each station to yield a final disentangled melt, produced at fast rate, with the proper final viscosity reduction ratio. For instance, a 5 station disentanglement apparatus, working at a low efficiency rate of 27.5% per station ($\mu_{out}/\mu_{in}=0.725$), produces a melt with final viscosity reduction of 5, which is $(0.725)^{-5}$. The throughput of such a multi station disentanglement apparatus is many times greater than the throughput of a single station working to produce the same result in terms of viscosity reduction. The operating cost per weight produced is also greatly reduced.

The inlet through which the molten moldable material passes through the treatment cavity is connected to at least one feeder for preparing a molten, moldable material. The feeder is spaced from the treatment cavity and any other feeder which may be present. The feeder includes a means for expelling the molten, moldable material through its outlet. This expelling action can be accomplished by any suitable means known to those skilled in the art. Some examples of feeders which include such an expelling means include, without limitation, screw pumps as used in extrusion and in injection molding apparatuses, twin screws as used with blends, plungers as used in two-stage molding apparatuses, gear pumps, and the like. This expelling action can include means to pulse the melt to facilitate flow, as described in References [12,13,14–16,19,20], although such a conditioning is not required by the present invention.

It is also within the scope of this invention for the apparatus to include a plurality of feeders. If a plurality of feeders are employed, the molten, moldable material prepared in each need not be the same. For example, each feeder can contain the same material. They can also contain the same material but at a different temperature, and/or different molecular weight characteristics, and/or different degree of disentanglement. Specifically, one material in one feeder may be a highly disentangled fraction coming from a different treatment station (downstream or else), whereas another material may be less disentangled. This changes the concentration of disentangled fractions and allows to engineer specific bimodal blends of grades having different states of disentanglement. The separate feeders can also contain materials which are virgin in one and recycled in another. Moreover, the individual feeders can contain completely different materials or materials which are filled or unfilled with fibers, fillers, different concentration of blends, pigments, anti-oxidants, flame retardant compounds, and the like, and/or any combination thereof. The second or third feed can be introduced into the disentanglement system at any inlet stage of the multi stations which chain up head to tail to continuously produce disentangled melts of given viscosity characteristics.

The apparatus also includes at least one accumulator for collecting the treated molten, moldable material before it is sent to either a pelletizer system or to a pumping station. In one embodiment of the present invention, the accumulator defines a cavity which continues to shear the collected disentangled melt and contains a series of immersed intermeshed rollers with ribs on their surface to preserve and maintain the state of disentanglement until the melt is pumped out of the accumulator by the controlled activation of a screw pump or a gear pump. In another embodiment of the present invention, the disentangled melt is pumped to a pelletizer line which quickly freezes the disentangled melt into pellets which are dried and bagged, ready for shipment. Any type of pelletizer line can be used. Upon reading this specification, those skilled in the art will know what type of pelletizer line can be added to the accumulator to freeze the state of disentanglement obtained through the treatment in order to practice the invention.

The treatment station includes means for exerting a shear vibration coupled with extensional flow on the molten, moldable material contained within the treatment cavity. The vibration is either created through direct oscillating means or indirectly, through the rotation of at least one profiled surface in contact with the molten moldable material. In one embodiment of the invention, a shaft supporting a surface in contact with the molten moldable material is oscillated by means known to a person in the art or any combination of them. A rotary vibration can be induced by hydraulic, pneumatic, electrical, electromagnetic means and the use of cams, connecting rods, and/or crankshafts. Any skilled person in the art will know how to create a rotary oscillation of frequency between 1 Hz and 100 Hz and of amplitude between 1 and 20 degrees. The periodic motion created does not require to be a pure sine wave and can be a mixture of several sine waves to create such periodic oscillation as square waves, triangular waves and the like.

In another embodiment of the present invention, the oscillation of the shaft connected to at least one surface in contact with the molten moldable material is coupled with a continuous rotation of the shaft, occurring at a certain rotation per minute. The coupling of the two motions can be done by programming the combined motion profile, which corresponds to a modulated rotation, and requesting the PID controller to follow the desired signal. But this solution requires extraneous efforts from the electric motors or hydraulic actuators and, in another embodiment of the present invention, the two motions are implemented from separately independent means, such as two electrical motors, and combined through an epicycle differential to recreate the modulated rotation on the shaft of the treatment cavity. In yet another embodiment of the present invention, two oscillatory motions of different frequency and amplitude are combined through the epicyclic differential to optimize shear vibration and extensional fatigue of the molten moldable material in order to practice the invention.

Another object of the present invention is to enable a shear vibration under extensional flow to occur with a full control of the strain rate and of the acceleration and deceleration of the shear strain. U.S. Pat. No. 5,885,495 teaches how to set both the frequency and amplitude of a shear vibration at a given temperature to achieve disentanglement of the macromolecules and obtain a reduction of melt viscosity. But strain, strain rate and strain acceleration are the derivative of one another and cannot be set independently. As explained earlier, the use of ribs and/or grooves and/or bumps (collectively and separately here called "rib means") to modulate the gap dimension, in conjunction with the relative motion of the surfaces which carry those ribs/grooves, allows to further control the degree of extensional flow, melt fatigue and melt flow acceleration/deceleration. The number of ribs/grooves, the height of the ribs/grooves, the width of the ribs/grooves, the surface area of the ribs versus the surface area of the grooves, are all inter-related parameters of the present invention, but with 3 or 4 degrees of freedom (depending on whether one or two surfaces are structured with ribs/grooves) instead of 2 in U.S. Pat. No. 5,855,495 to apply a chosen strain rate, strain amplitude and frequency of shear vibration under extensional fatigue. The advantage of the extra degree(s) of freedom can be used, in a specific embodiment of the present invention, to optimize disentanglement effects, i.e. reduce the energy required to disentangle a certain quantity of entangled resin and/or increase the throughput by accelerating the kinetics. Upon reading this specification, those skilled in the art will know how to calculate the dimensions of the ribs, their number and the speed of rotation of the lateral dragging flow to produce the desired and controlled strain rate and acceleration/deceleration in the treatment cavity in order to practice the invention.

In another embodiment of the present invention, the ribs/bumps top surface is curved to smooth out any sharp angle which could be detrimental to the flow, in particular with regard to non linear flow defects which might arise from unsmoothed angles including the formation of microbubles. Specifically, the shape of the bumps/ribs is to avoid such non linear flow defects.

In yet another embodiment of the present invention, the shape and relative disposition (pitch) of the ribs/bumps is determined by their ability to create local stress fields which can percolate into a cooperative network for specific conditions of rotation speed $\Omega$, frequency $\omega$ and amplitude $\alpha$ of shear vibration, and temperature. That is the stress fields of one rib must overlap that of an adjacent rib.

Also included in this apparatus are means to continuously drag and/or pump the melt located in the station treatment cavity from the inlet conduit towards its outlet conduit. This is accomplished by means of the disposition of the ribs with respect to the rotational flow direction. If the ribs are disposed perpendicular to the rotation direction, the molten moldable material is dragged in that direction and any motion in the longitudinal direction is due to pressure flow exerted at the inlet of the treatment cavity. Pressure might have a negative effect on the kinetics of disentanglement and, for this reason, should be maintained in the range which does not adversely affect the treatment. By orienting the ribs by a certain angle with respect to the axis of rotation, it is possible to create a longitudinal drag component with its own strain rate and acceleration. This longitudinal component of the rotational motion adds to the effect of pressure flow to contribute to the transport and disentanglement of the molten moldable material. Upon reading this specification, those skilled in the art will know what ribs orientation will produce the desired and controlled pumping effect in the treatment cavity in order to practice the invention.

In one embodiment of the present invention, the surface profile of ribs/grooves is created by machining and grooving the surface of the treatment cavity permanently and in another embodiment of the present invention, foils of profiled strips which are manufactured separately are laid over and firmly mounted on the body of the treating surfaces. In one embodiment of the present invention the strips are made of a metallic material and, in another embodiment, they are made of any other material capable of sustaining the combination of shear forces, vibration and temperature required for the treatment.

The treatment station includes means for varying the amplitude of the shear vibration applied on the molten moldable material as it flows through from the inlet to the outlet of the treatment station. U.S. Pat. No. 5,885,495 teaches that slippage may occur at high amplitude of melt shear oscillation which disrupts the efficiency of the disentanglement process. When the desired amplitude for disentanglement is applied all at once, the risks of slippage are increased, which suggests to gradually increase the strain amplitude of vibration until the correct combination of frequency-temperature and strain % is obtained. In a discontinuous process, such as described in U.S. Pat. No. 5,885,495, the settings and parameters are programmed to vary gradually, which avoids the slippage problem. Specifically, the strain % of the shear vibration is increased little by little, given a certain temperature and frequency of oscillation. Likewise, at a given temperature and strain %, the frequency is increased little by little until the desired combined setting is achieved. For a continuous disentanglement process, the gradual increase of the strain % can be accomplished by a gradual change of the geometry of the gap along the pathway of melt flow. The strain amplitude is function of the gap geometry, as explained before. For example, one can increase the shear strain % by increasing the radius of the cylinders of the annulus which form the gap. Specifically, a preferred embodiment of the present invention uses a pair of concentric conic surfaces for defining the gap in the treatment cavity. This preferred embodiment offers the added advantage of being able to easily change the gap dimension by pulling the inner cone surface with respect to the outside cone surface. Gaps between 0.5 mm and 5 mm can be obtained that way, which can be adjusted on the fly as the molten moldable material flows in the treatment cavity. Another preferred embodiment consists of concentric cylindrical surfaces whose radius increases in stages as flow proceeds from the inlet to the outlet of the treatment cavity.

In one specific embodiment of the present invention, the gap height is automatically adjustable through an actuator and a controller allowing an increase or decrease of the gap at intermittent intervals, thus modulating the gap dimension in a controllable way.

Also included in this apparatus is a means for controlling the temperature of the material within the feeder(s), accumulator(s) and/or treatment cavity. Any suitable temperature controlling means can be employed when practicing this invention.

Examples of suitable temperature control means include, without limitation, the implementation of the following: (a) hot and cold oil circulated through passages in the injection machine, the accumulator, the injection nozzle and/or the mold, (b) resistance cartridges positioned within the injection machine, the accumulator, the injection nozzle and/or the mold, (c) hot pipes inserted into the injection machine, the accumulator, the injection nozzle, and the mold, and/or (d) fluid which is embedded in the injection machine, the accumulator, the injection nozzle and/or the mold and whose temperature can be controlled by dielectric means. Those skilled in the art will be able to select the temperature controlling means which best suits their needs after reading this specification.

Also included in this apparatus is a means for controlling the pressure of the molten moldable material within the feeder(s), accumulator(s) and/or disentanglement treatment cavities. In particular, the rate of flow in the screw pump(s), gear pump(s), treatment cavities and extruder can be controlled by melt pressure in the treatment cavity measured by pressure sensors and transducers. Any suitable pressure controlling means can be employed when practicing this invention. Those skilled in the art will be able to select the pressure controlling means which best suits their needs after reading this specification.

Also included in this apparatus is a means for monitoring and/or controlling the torque of the material within the treatment cavity. The torque is directly related to the modulus of the molten moldable material being treated and reflects the state of viscosity. Any suitable torque monitoring and/or controlling means can be employed when practicing this invention.

Examples of suitable torque control means include, without limitation, the implementation of the following: (a) measure of the current used by the motor(s) to maintain a given rotation speed of the shaft driving the relative motion of at least one surface in contact with the molten moldable material to be disentangled, (b) installation of a shear stress transducer at the end of the treatment cavity, (c) measure of the speed of transmission and attenuation of ultrasonic acoustic waves through the gap in the treatment cavity. Those skilled in the art will be able to select the torque controlling means which best suits their needs after reading this specification.

In addition to the above, the apparatus can include many different optional features. For example, the apparatus can include a purge valve which can be positioned between the accumulator(s) and the mold and/or between the feeder(s) and the accumulator(s).

Another optional feature which can be included in the present invention is a mixing chamber positioned in the pathway of the inlet to the treatment cavity and/or at the outlet of the treatment cavity. This mixing chamber, which can consist of a static mixer in one preferred embodiment, can homogenize the temperature and the viscosity of the molten moldable material, and optimize the mixing of the different slices of the molten moldable material treated in the gap of the treatment cavity. In the case several feeders are used, the mixing chamber creates an more homogeneous mix of the different ingredients.

Specific embodiments of this invention are illustrated in FIGS. 1–15. These illustrations are merely examples of manners in which to practice the invention. They are, in no way, intended to limit the scope of this invention.

Other objects, aspects and advantages of the present invention will be apparent to those skilled in the art upon reading the specification and the appended claims which follow.

A more complete appreciation of the present invention, and many of the attendant advantages thereof, will be readily ascertained as the invention becomes better understood by reference to the following detailed description, when considered in connection with the accompanying figures briefly described below.

Referring now to FIGS. 1A to 1F, FIG. 1A is a schematic illustration of one embodiment of a disentanglement apparatus designed in accordance with the present invention having a single feeder 4 and a single treatment cavity 3, between an undersurface 2 of a top member 54 and a top surface 56 of a bottom member 58 wherein the shear vibration under extensional flow is produced by rotating at constant speed and/or at modulated speed and/or by pure oscillation an incoming melt 1 which flows outwards over ribs or ribs means 5 disposed on at least one surface 2. The molten moldable material 1 flows circularly from the center of the disk to the rim where a doctor blade collects it and a gear pump positively displaces it away from the treatment cavity. The cavity gap 3 is structured by the ribs 5 which can be shaped and configured in a variety of ways, as shown in FIGS. 1C, 1D, 1E, and 1F, specifically designed to exert the maximum control over the strain rate, strain rate variation and extensional strain as the melt flows from the inlet to the outlet and in order to optimize its disentanglement.

Figure 1C:
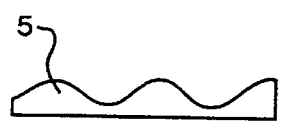
Figure 1D:
Figure 1E:
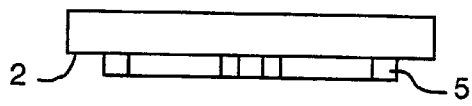
Figure 1F:
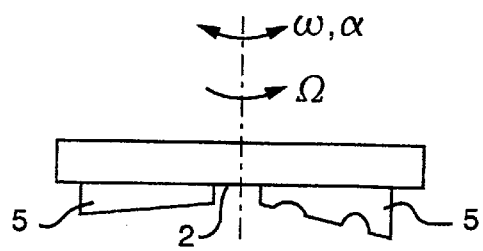

In one embodiment of the present invention, one surface in contact with the melt rotates at constant speed $\Omega$ and the other surface is fixed. The strain rate is locally modulated by the presence of the ribs which create the extensional vibration required to produce disentanglement effects. The number of ribs, the height of the ribs, the width of the ribs, and the height of the gap in between the ribs are all inter-related parameters of the present invention, which must be specifically designed in order to produce the adequate strain rate, strain amplitude and frequency capable of producing disentanglement effects, as taught in U.S. Pat. No. 5,855,495. For instance, for a gap height between 0.5 and 4 mm, rib height can be approximately 25% of gap height and rib width 50% of gap height. The number of ribs, to be spaced regularly, depends on the strain and frequency required for the disentanglement process and on the speed of rotation. When the space between the ribs is relatively important, care should be taken to design the ribs corners and shape angles to avoid local turbulence and other non linear flow defects. FIGS. 1A to 1F show several possible geometries for the ribs 5. In one embodiment of the invention (FIG. 1F), the height of the ribs is not constant across the radius and increases slightly from the center of the disk to the edge, or vice versa. In another embodiment of the present invention, the ribs surface is not flat but is, instead, grooved at regular intervals perpendicular to the radial direction of flow (FIGS. 1C and 1D).

In another embodiment of the present invention, the moving surface is not rotating but oscillates back and forth with a certain amplitude α and frequency ω. Yet, in another embodiment of the present invention a combination of oscillation and constant rotation is exerted on the moving surface. The value of the amplitude and frequency of vibration and the value of the melt temperature are determined according to U.S. Pat. No. 5,885,495 in order to increase the amount of elasticity in the melt. The constant speed of rotation ω is also determined to bring the melt within the proper processing window for disentanglement to occur, and its value is adjusted, along with the number of ribs, the geometry of the ribs and their disposition with respect to melt flow direction, in order to optimize disentanglement, that is to say favor the kinetics of viscosity reduction to make it as efficient as possible in the shortest time as possible.

In another preferred embodiment of the present invention, both surfaces in contact with the molten moldable material have ribs and/or grooves. Yet, in another important embodiment of the present invention, both surfaces in contact with the molten moldable material are in controlled independent motion. In this case, although the apparatus is more complicated to design and operate, disentanglement is more efficient and occurs deeper throughout the cavity gap, allowing the use of wider gaps which results in increased productivity.

Figure 2A:
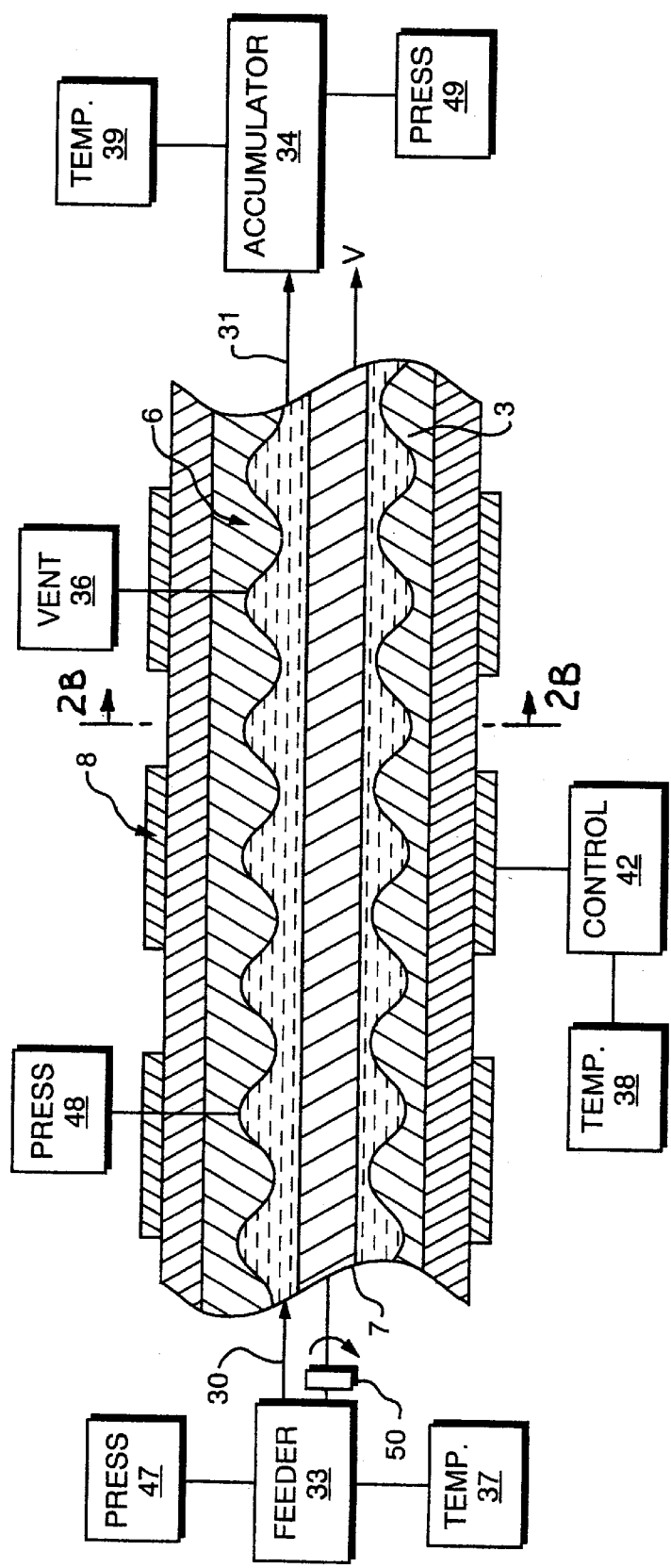
Figure 2B:
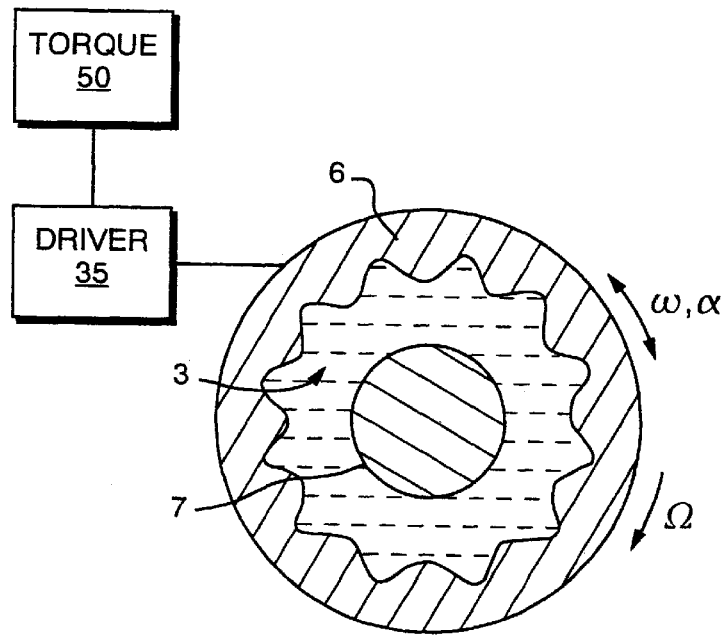
FIG. 2B is a sectional view taken along line 2B—2B of FIG. 2A.

FIGS. 2A and 2B are schematic illustrations of one embodiment of a disentanglement apparatus designed in accordance with the present invention having a single feeder and a single treatment cavity, wherein the shear vibration under extensional flow is produced by feeding a molten moldable material 3 through a gap (also identified by numeral 3) composed of at least one rotating and/or oscillating surface 6 or 7 presenting on its contour a profile over which the molten material flows and/or can be dragged and/or is being pushed through and/or pumped through. In FIG. 2B the outside surface 6 may be rotated/oscillated at constant speed o and the other e.g., cylindrical surface 7 may be fixed, or, conversely, surface 7 may be rotated/oscillated (FIG. 2A) at constant speed and surface 6 may be fixed, or, both surfaces may be rotated/oscillated independently. The strain rate is locally modulated by the presence of ribs and/or grooves on either surface 6 and 7, or on both surfaces, which create the extensional and fatigue flow with vibration required to produce disentanglement effects. The number of ribs/grooves, the height of the ribs/grooves, the width of the ribs/grooves, are all inter-related parameters of the present invention, which must be specifically designed in order to produce the adequate strain rate, strain amplitude and frequency capable of producing disentanglement effects, as taught in U.S. Pat. No. 5,855,495. For instance, the rib on one surface might be a continuous bump configured as a right helix, whereas its counterpart on the facing surface is another helix with same pitch but turning left. The two helices can be grooved at an angle with the axis of the helix to produce a periodic variation of the gap height along the helix rib top surface. In such a case, when the two surfaces are put in relative motion, by the rotation of at least one surface, the melt is not only sheared and oscillated under extensional flow but also dragged through towards the exit end. The molten moldable material 3 flows helicoidally from the inlet of the treatment cavity, at the left of FIG. 2A, towards the outlet, at the right, where it is collected and a gear pump positively displaces it away from the treatment cavity. The cavity gap 3 is profiled by the ribs which can be shaped and configured in a variety of ways, as already shown in FIGS. 1A to 1F, specifically designed to exert the maximum control over the strain rate, strain rate variation and extensional strain as the melt flows from the inlet to the outlet and in order to optimize its disentanglement. Band heaters 8 are located around the metallic surfaces defining the cavity and are controlled by thermocouples in PID control loops 32.

Figures 5, 6:
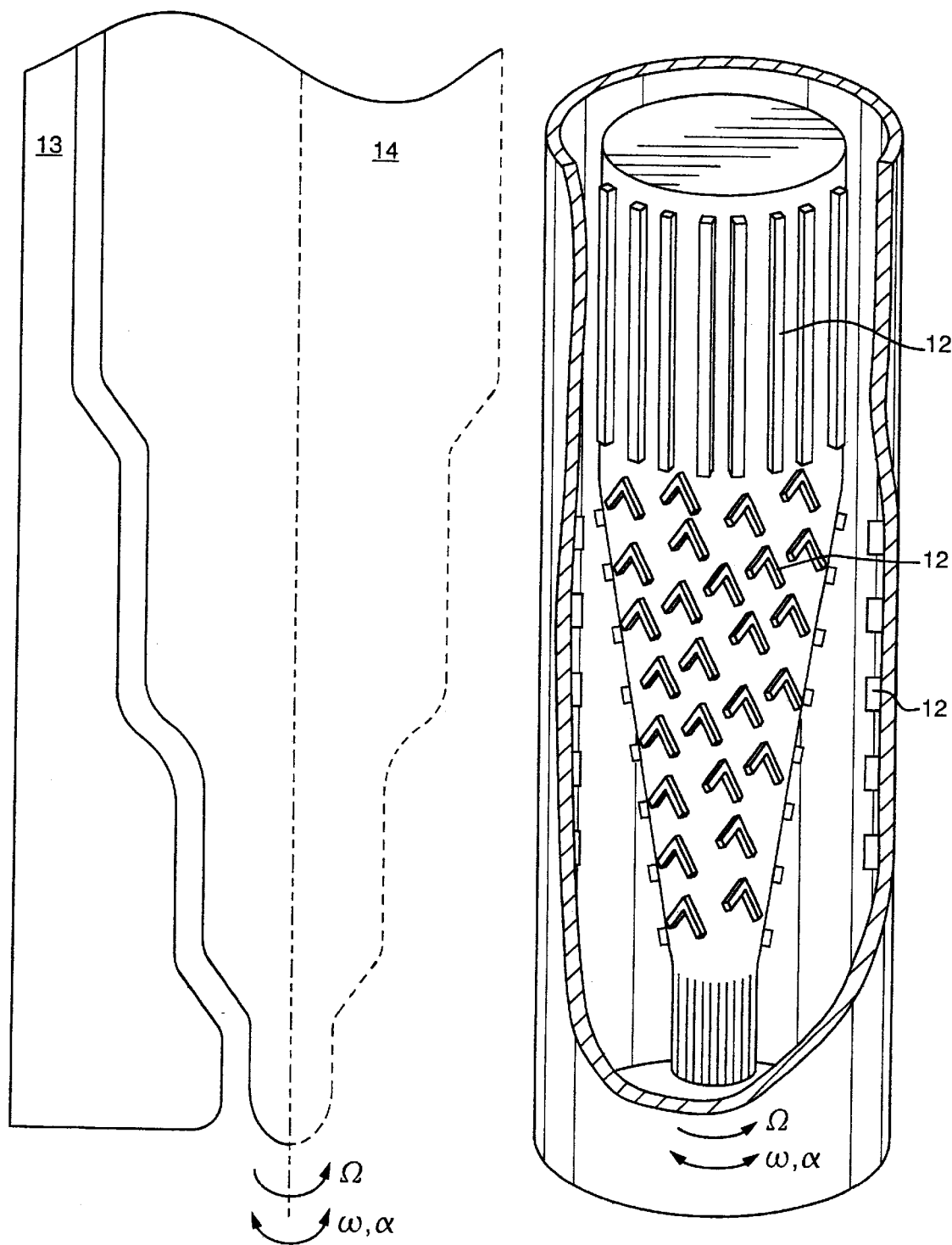
FIG. 5 is a schematic illustration of one embodiment of the treatment cavity of the disentanglement apparatus designed in accordance with the present invention.
FIG. 6 is a schematic illustration of one embodiment of the treatment cavity of the disentanglement apparatus designed in accordance with the present invention.

The apparatus of the invention as illustrated in FIGS. 2A and 2B thus is for continuously reducing the viscosity of molten moldable polymeric material 3 by shear vibration under extensional flow to cause disentanglement, the apparatus including at least one station treatment cavity defined by a gap composed of two closely separated surfaces 6 and 7 in relative motion with each other at given speed and/or submitted to relative oscillations, with given frequency and amplitude, as to produce a shear deformation on the molten moldable material 3 and a controlled variation of the gap dimension by axial, circumferential, radial or other undulations of either or both surfaces 6 and 7, presenting on their contour a profile of ribs and/or bumps and/or grooves over which the molten moldable material 3 can flow and/or can be dragged and/or is being pushed through and/or pumped through. The treatment cavity has an inlet 30 through which the molten moldable material 3 can pass into and an outlet 31 through which it can exit the treatment cavity. The treatment cavity geometry allows the shear strain and the shear strain rate imposed on the passing molten moldable material to vary controllably. At least one feeder 33 is for preparing the molten moldable material 3, the feeder including a means for expelling the molten, moldable material through its outlet into the station treatment cavity inlet 30. At least one accumulator 34 is provided for collecting the treated molten, moldable material before it is sent to either a pelletizer system or to a pumping station. Means such as a driver 35 are provided for exerting the shear vibration of given frequency and amplitude coupled with fatigue extensional flow on the molten moldable material 3 contained within the treatment cavity. An example of means for controllably varying the gap dimension which the molten moldable material can pass and/or flow through are shown in the embodiment of FIG. 6 there a central member of the apparatus is generally conical and can be moved to vary the gap. An example of means for continuously venting the treatment cavity to prevent the formation of bubbles or cavitation during the treatment is schematically shown at 36 in FIG. 2A. An example of means for monitoring and controlling the temperature of the molten moldable material contained within the feeder 33 is schematically shown at 37 in FIG. 2A, for the treatment cavity is schematically shown at 38 and for the pumping station is schematically shown at 39. An example of means for monitoring and controlling the pressure of the molten moldable material contained within the feeder, the treatment cavity and the pumping station are shown schematically at 47, 48 and 49 respectively. An example of means for monitoring and controlling the torque exerted on the molten moldable material contained within the treatment cavity is shown at 50 in FIGS. 2A and 2B. With several stations connected to one another through gear pumps or screw pumps such as those at 11 in FIG. 3 or 26 in FIG. 7, the chain of treatment stations have a first station connected directly or through a gear pump and/or a static mixer (e.g. 52 in FIG. 7) to an extruder and a last station connected to a pelletizer line or a pumping station for immediate use of the disentangled melt.

In one embodiment of the present invention, one surface in contact with the melt, which has a pattern of ribs as explained in FIG. 1, is moved longitudinally with speed V, as shown for surface 7 in FIG. 2, and the other surface is rotated/oscillated. The melt undergoes the effect of a combined (tensorial) periodic strain rate with its two components, in the longitudinal and rotational directions, adjusted to impose an optimized disentanglement effect. Yet, in another embodiment of the present invention, the longitudinal motion of 7 occurs with modulated speed in order to incorporate an oscillation component susceptible to facilitate the raise of the elasticity of the molten moldable material in the gap while the lateral rotation of 6, with or without its own oscillation, contributes, among other things, to the extensional fatigue in order to disentangle the melt according to U.S. Pat. No. 5,885,495.

In another embodiment of the present invention, the moving surface is not rotating but oscillating back and forth with a certain amplitude α and frequency ω. Yet, in another embodiment of the present invention a combination of oscillation and constant rotation is exerted on the moving surface(s). The value of the amplitude and frequency of vibration, the melt temperature, and the constant speed of rotation Ω. along with the number of ribs, are determined according to U.S. Pat. No. 5,885,495 in order to increase the amount of elasticity in the melt, and cause the melt to undergo extensional flow and fatigue, two critical conditions for disentanglement to occur. Specifically, the number of ribs, the geometry of the ribs and their disposition with respect to melt flow direction, are designed not only to create specific acceleration and deceleration patterns in the cavity gap susceptible to favor the kinetics of disentanglement, but, at the same time, to allow a certain pumping of the melt towards the outlet of the treatment cavity by a dragging effect from the component of the strain rate tensor which aligns with the longitudinal direction of flow.

Figure 3:
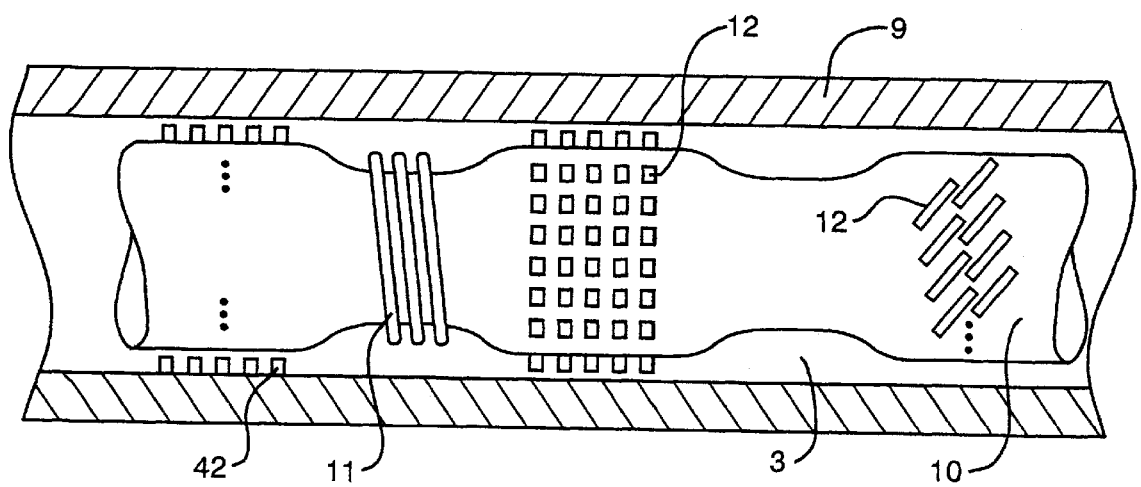

FIG. 3 is a schematic illustration of one embodiment of a disentanglement apparatus designed in accordance with the present invention having a single feeder and more than one treatment cavity, separated by a pumping section 11, wherein the shear vibration under extensional flow in the treatment cavity section is produced by feeding a molten moldable material 3 through a gap composed of at least one rotating and/or oscillating surface 10 presenting on its contour a profile 12 over which the molten material flows and/or can be dragged and/or is being pushed through and/or pumped through, and a barrel 9 which can also be rotated/oscillated or can be stationary and which is heated/cooled through outside means( not represented). The surface profile(s) or rib means 12 consist of different patterns depending on the location of the treatment station along the extrusion axis and adapted to the progressive change of the viscosity. FIG. 3 displays a few patterns possible such as small square/round bumps on the surface, or tilted and elongated ribs creating a split of the strain rate along the rotational and longitudinal axes, but many other designs all referred to here as rib means are conceivable, which a person skilled in the art will be able to adapt after reading this disclosure. The pumping station 11 is made of the few flights of a screw pump with given pitch and helix angle to pump the melt at given rate from one treatment station to the next by rotating the core surface 10. The apparatus described in FIG. 3 can be adapted to interface with the basic hardware of an extruder which already provides a barrel 9, heating and cooling means, and a motor to produce the rotation of the moving surface 10, which would replace the screw of the extruder. In one embodiment of the present invention, the feeder which provides a liquid molten moldable material to the treatment cavity is itself another extruder or an extruder connected to a gear pump. For example, the molten moldable material is produced by the first extruder and is distributed through a breaker plate and a cross-head die to the inlet section of the second extruder, perpendicular to the first extruder, which attaches to the left end side of FIG. 3. The moving surface 10 is rotated by the second extruder and its barrel 9 is stationary. The total length of the barrel is adjustable and is function of the numbers of stations required to achieve a certain level of viscosity reduction and the throughput desired.

Yet, in another embodiment of the present invention, only one extruder is needed, but the screw, which is replaced by the treatment apparatus described in FIG. 3 in order to practice the present invention, is substantially extended in length to have a first section performing like a normal screw with its own melting, metering and pressurizing zones, followed by the disentanglement sections described in FIG. 3.

Figure 4:
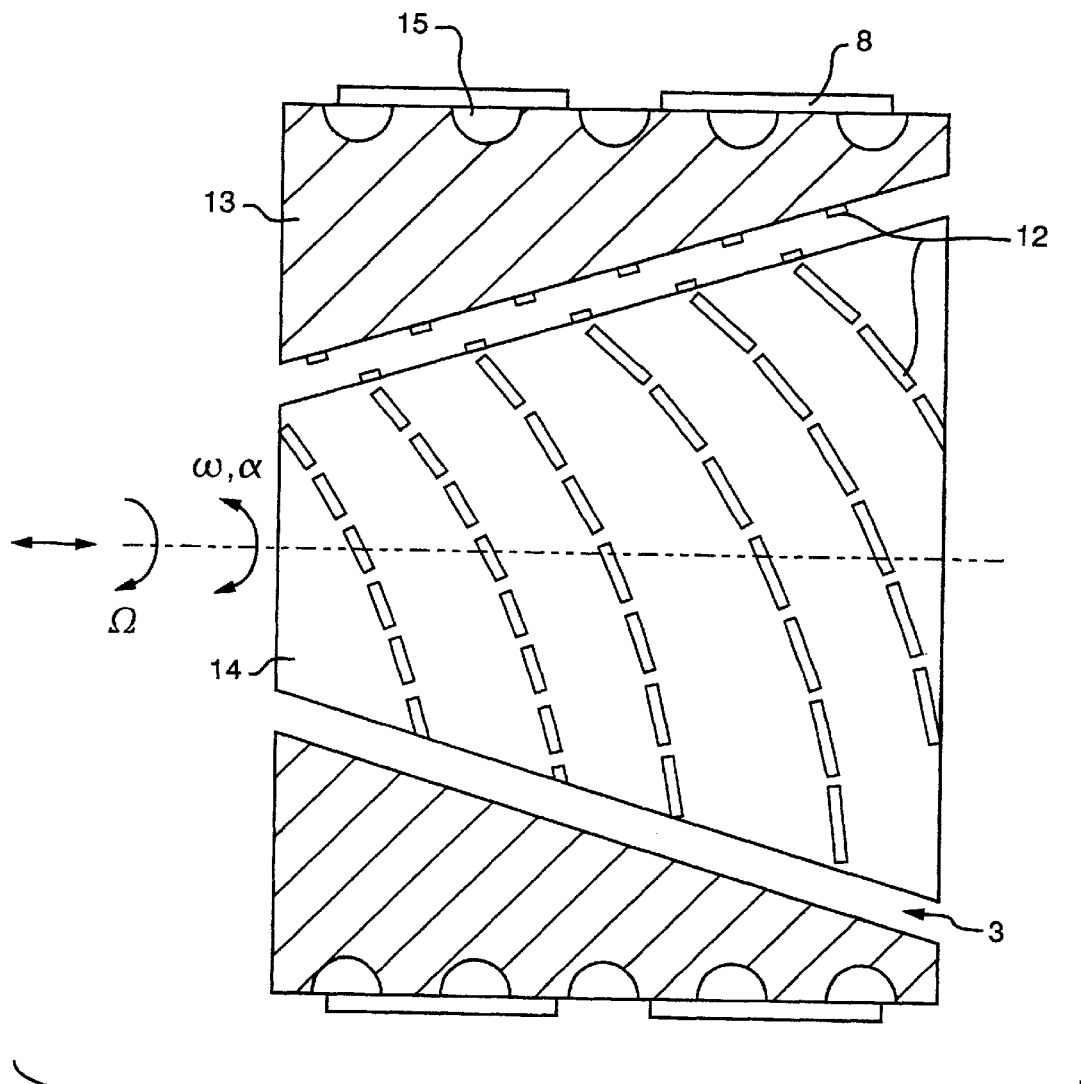
FIG. 4 is a schematic illustration of one embodiment of the treatment cavity of the disentanglement apparatus designed in accordance with the present invention wherein the shear vibration under extensional flow is created in the gap of concentric conic surfaces in relative motion with respect to one another, at least one of which presenting an array of ribs and bumps and rotating at constant speed and/or at modulated speed and/or in a pure oscillation mode.

FIG. 4 is a schematic illustration of one embodiment of the treatment cavity of the disentanglement apparatus designed in accordance with the present invention wherein the shear vibration under extensional flow is created in the gap 3 of concentric conic surfaces 13 and 14 in relative motion with respect to one another, at least one of which presenting an array of ribs and bumps 12 and rotating at constant speed Ω, and/or at modulated speed [ω+Σ$α_i$*sin($ω_i$*t+$θ_i$)] and/or in a pure oscillation mode Σ$α_i$*sin($ω_i$*t+$θ_i$), where $α_i$, $ω_i$, $q_i$ are, respectively, the modulated amplitude, the frequency and the phase of the oscillation (the subindex "i" refers to the decomposition of the periodic motion into its Fourier's components). As explained before, the speed of rotation, the oscillation parameters, the pitch between the ribs, the shape and dimension of the ribs/bumps and grooves (between the ribs), and the angle of tilt with respect to the cone axis of the ribs, are all inter-related and depend on the strain rate and acceleration required to produce disentanglement, as taught in U.S. Pat. No. 5,885,495.

In FIG. 4, the gap height can be increased or decreased by the relative translation of the concentric cones, which can be done through the implementation of linear bearings on the shaft. In a particular and specific embodiment of the present invention, the gap height is automatically adjustable through an actuator and a controller opening or closing the gap, allowing an increase of the gap at intermittent intervals, to facilitate the extrusion of the treated molten moldable material out of the treatment cavity. The reason for such a feature can easily be understood: the disentanglement process requires a relatively narrow gap to implement the conditions of strain and strain rate susceptible to disentangle the melt; but these conditions are not favorable to the throughput. By opening and closing the gap intermittently between a value which is favorable to the treatment and a value which is favorable to the throughput, a compromise can be found which optimizes the disentanglement process. The period between two successive openings of the gap can be programmed between 1 second and 10 minutes, without exclusion of other possible values. The variation of the gap height between its minimum and maximum value can be programmed between 5% and 200% of the treatment value.

It is another object of the present invention to have a central computer controlling the value of all the parameters of the disentanglement process. Specifically, in FIG. 4, items 8 and 15 are shown to respectively represent band heaters and cooling circuits to regulate precisely the temperature of the body of the surfaces in contact with the molten moldable material. Temperature probes (not shown) are inserted near the molten moldable material to send electrical signals back to the central processing unit for activating the heating or cooling means in order to maintain the temperature in the gap constant. The operator can interface with a user friendly computer screen to enter all the parameters required to operate the disentanglement apparatus according to the present invention. For example, the operator enters the value of the temperature in the treatment cavity, the speed of rotation of the inner cone 14, the amplitude and frequency of the oscillation of the cone (which can be zero) and the period and amplitude of the gap intermittent opening (whose variation can also be zero).

FIG. 5 is a schematic illustration of one embodiment of the treatment cavity of the disentanglement apparatus designed in accordance with the present invention wherein the shear vibration under extensional flow is created in the gap of a series of concentric cylindrical surfaces 13 and 14 of increasing larger diameter, in relative motion with respect to one another, at least one of which presenting an array of ribs and bumps and rotating at constant speed and/or at modulated speed and/or in a pure oscillation mode.

FIG. 6 is a schematic illustration of one embodiment of the treatment cavity of the disentanglement apparatus designed in accordance with the present invention wherein the shear vibration under extensional flow is created in successive sections of the treatment cavity having a variable gap arising from the relative separation of concentric surfaces in relative motion with respect to one another, at least one of which presenting specifically configured and disposed ribs and bumps 12 and rotating at constant speed and/or at modulated speed and/or in a pure oscillation mode. As shown in FIG. 6, the shape of the ribs/bumps and their relative position is varied along the pathway of the molten moldable material in the treatment cavity depending on the amount of local melt pressure, the magnitude of the longitudinal drag strain rate desired and the speed and mode of rotation of the moving surface.

Figure 7:
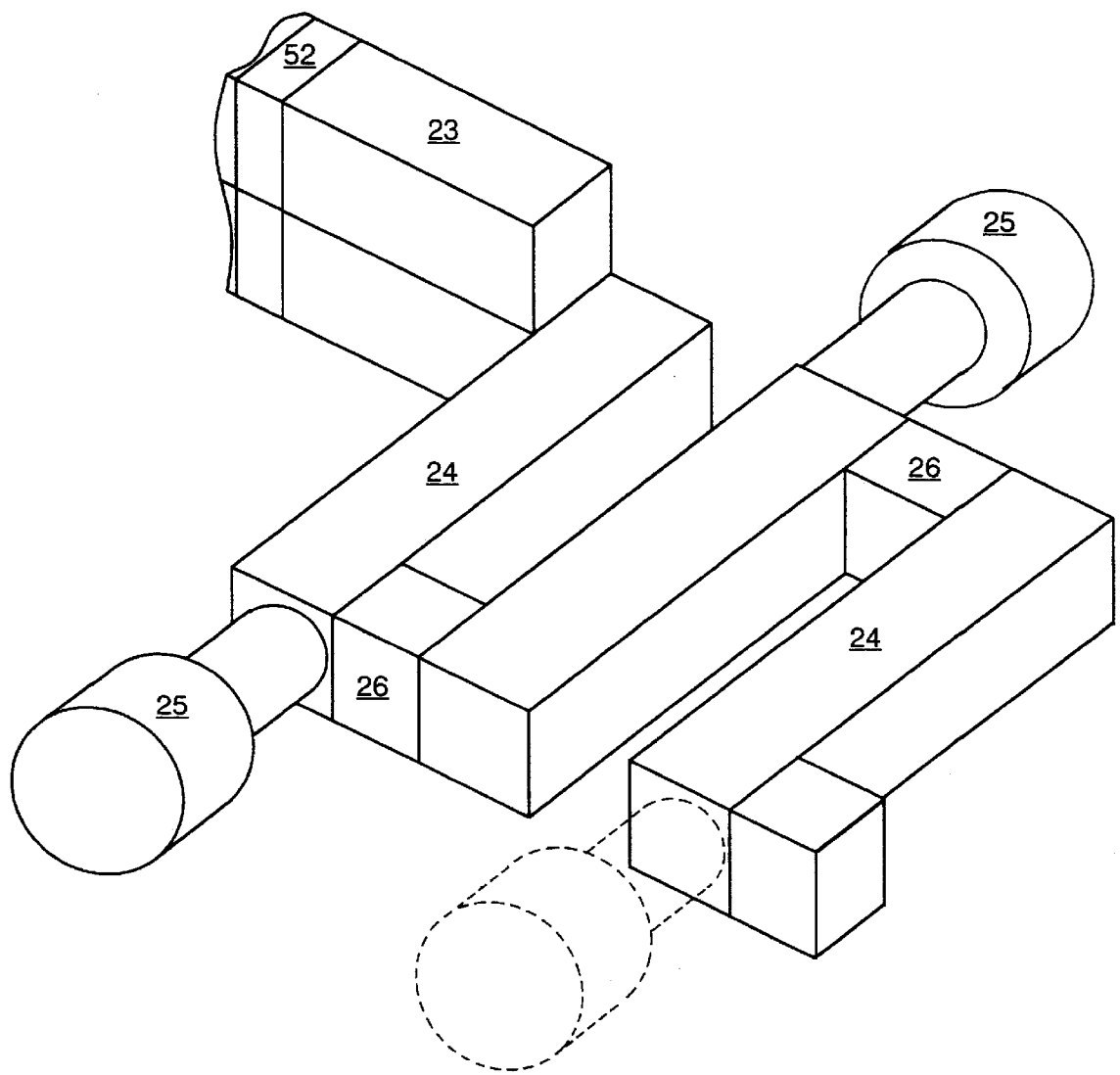
FIG. 7 is a schematic illustration of one embodiment of the disentanglement apparatus designed in accordance with the present invention wherein the feeder is an extruder and/or a plunger, the disentanglement treatment occurs in a series of stations connected through gear or screw pumps, and the accumulator of the last station is connected to a pelletizer line and/or the feed of an extruder or injection molding equipment.

FIG. 7 is a schematic illustration of one embodiment of the disentanglement apparatus designed in accordance with the present invention wherein the feeder 23 is an extruder and/or a plunger, and the disentanglement treatment occurs in a series of stations 24 connected through gear or screw pumps 26. In each of the stations 24, means 25 are provided to rotate and/or oscillate at least one surface in contact with the molten moldable material passing through it in order to create flow conditions favorable to disentanglement, as described in U.S. Pat. No. 5,885,495 and in this disclosure. The temperature, the rotation speed, the oscillation amplitude and frequency are independently set for each station, but are controlled from a central processing unit which overlooks all aspects of this multi-stations disentanglement process. For practicing particular embodiments described earlier in this Patent application, stations 24 and the means 25 can be provided for by traditional extruder drives, for which barrel and screw can be specifically adapted and modified to conform to disclosures specified in FIGS. 3, 4, 5 or 6. Mixing chambers can be added in 26, as well as in 25 means to modulate the gap dimension intermittently. At the end of the multi-stations, the disentangled melt is pumped into an accumulator, not shown in FIG. 7, but described in this disclosure to prevent the melt to re-entangle, and this accumualtor is connected to a pelletizer line and/or to the feed of an extruder or injection molding equipment.

Figure 8:
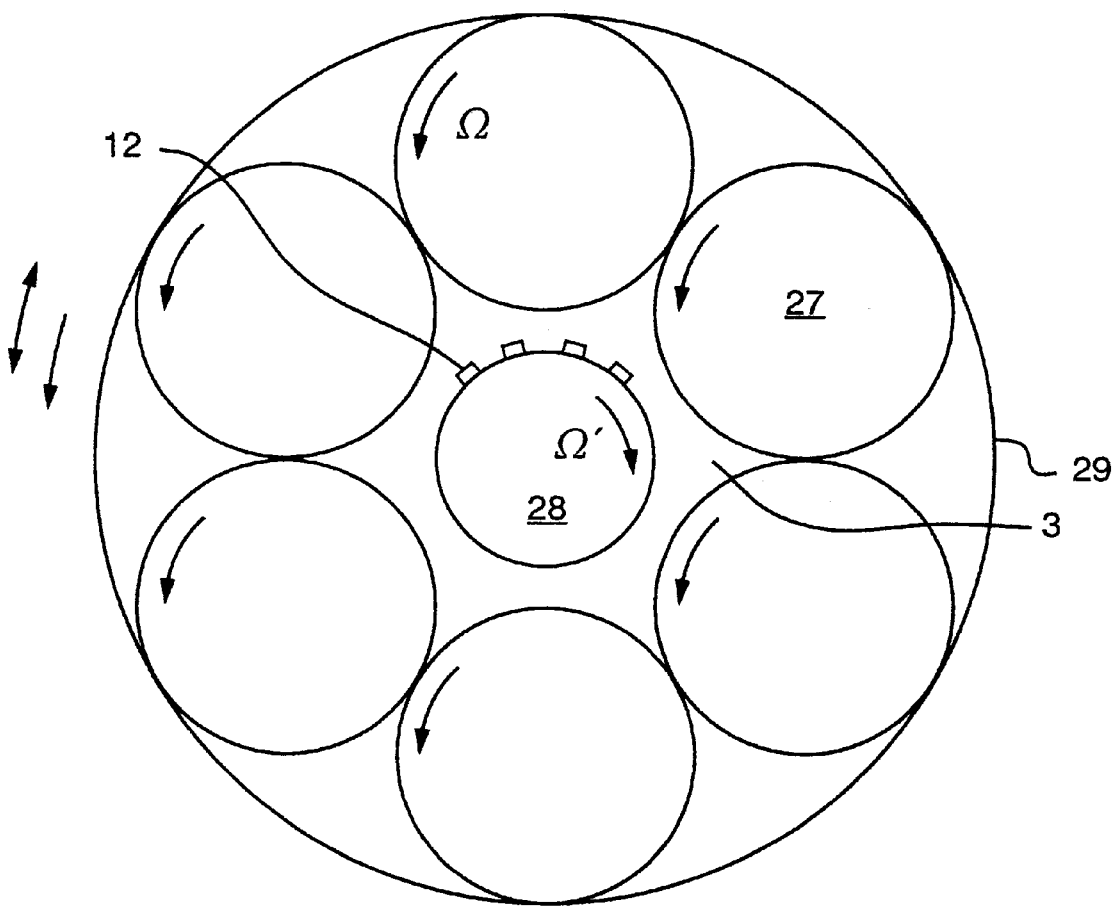
FIG. 8 is a schematic illustration of one embodiment of the treatment cavity of the disentanglement apparatus designed in accordance with the present invention wherein the shear vibration under extensional flow is created in the gap between cylindrical or conical rollers in close contact to one another and creating a rolling and/or vibrating wall, and a core surface at the center, at least one surface rotating at constant speed and/or at modulated speed and/or in a pure oscillation mode.

FIG. 8 is a schematic illustration of one embodiment of the treatment cavity of the disentanglement apparatus designed in accordance with the present invention wherein the shear vibration under extensional flow on a molten moldable material 3 is created in the gap between cylindrical or conical rollers 27 in close contact to one another and a core surface at the center 28, with ribs, bumps or grooves 12 and which is either cylindrical or conical. FIG. 8 can be considered a cut through the system of cylinders which one could imagine vertical, with their axis perpendicular to FIG. 8, and the flow of molten moldable material occuring from the inlet at the top, along the axis of the cylinders or cones, towards the outlet at the bottom. More generally, at least one surface 27 or 28 is rotating at constant speed and/or at modulated speed and/or in a pure oscillation mode, as explained in several previous Figures. For instance, both surfaces are turning at constant speed, respectively $\Omega$ and $\Omega'$. The rotation of rollers 27 can be from individual power sources or through a common drive, shown as 29 in FIG. 8, which can be a belt or any other appropriate driving mechanism known to the art. At least one surface has a set of ribs/bumps 12 or grooves on it, shaped, disposed and configured to practice the invention, as already disclosed several times for the other Figures. It is easy to conceive the presence of ribs/bumps or grooves on the core cylinder 28. Some are shown in FIG. 8. Rollers 27 are in close contact but do not touch each other directly, so they can turn in the same direction (counterclockwise in FIG. 8). In one embodiment of the present invention, the distance which separates them is very small, of the order of 0.03 to 0.05 mm in order to prevent the molten moldable material 3 to come through their separation. A set of spring loaded ball bearings can be used to keep the rolling cylinders at very close proximity while rotating in the same direction through means 29 In another embodiment of the present invention, rollers 27 can have ribs and bumps disposed on their surface so that they intermesh in the region of closest proximity. An example of this embodiment is shown at the bottom of FIG. 14. Starting at a certain speed of rotation $\Omega$ c, the layers of molten moldable material in contact with 27 have enough elasticity built up from the speed of rotation of rollers 27 to "stretch over", i.e. ignore the contours of the gap formed where the rollers intermesh or come into close contact, and create an homogeneous round circularly rotating layer which encapsulates and drives in its rotation the rest of the molten moldable material enclosed in the gap between the rollers 27 and roller 28. The stretch-over moving wall, created by cooperative motion across the rotating rollers, can be used, in one preferred embodiment of the present invention, to minimize or avoid slippage at the wall while practicing the disentanglement process through rotation/oscillation of 28. Furthermore, this embodiment allows far greater speed of extrusion through the treatment cavity than is normally available at low pressure drop, because wall slippage is known to prevent fast extrusion throughput. Finally, depending on the speed of rotation of 28, processing the molten moldable material under conditions where a stretch-over layer is created can present positive advantages on the kinetics of disentanglement.

Figure 9:
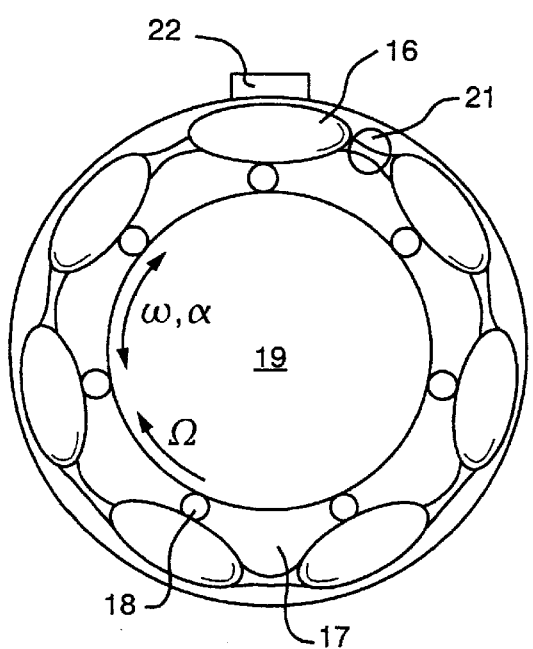
FIG. 9 is a schematic illustration of one embodiment of the treatment cavity of the disentanglement apparatus designed in accordance with the present invention wherein the shear vibration under extensional flow is created by the relative motion in the molten moldable material of a train of submarine-shaped wagons circulating, at constant speed or at a modulated speed, in a torus ring in communication with an inlet and an oulet conduits.

FIG. 9 is a schematic illustration of one embodiment of the treatment cavity of the disentanglement apparatus designed in accordance with the present invention wherein the shear vibration under extensional flow is created by the relative motion in the molten moldable material 17 of a train of oblong members or ovally-shaped wagons 16 circulating, at constant speed or at a modulated speed, in a torus ring in communication with an inlet 21 and an oulet 22 conduits. The motion of 16 is driven by a cyclinder 19 through links 18. 19 is a cylinder driven by an actuator connected to a motor. 18 is a link or spider ring connecting rigidly 19 and 16, and letting the flow pass through without resistance or interference. The torus is jacketed by a thermal fluid and/or band heaters and water passages allow control of the temperature inside the ring. As motion of 16 in the molten moldable material 17 is driven by 19, the gap at any specific location of the ring periodically increases and decreases as the ovally shaped wagons pass through it, and thus periodic shear strain conditions are created with intensive extensional flow around the wagons. When the conditions of strain rate and strain rate variation (acceleration/deceleration) are set to practice disentanglement in the molten moldable material according to U.S. Pat. No. 5,885,495, the treated melt is being pushed ahead towards the outlet hole 22 communicating with the inlet 21 of the next torus ring one station down. An assembly of torus rings 67 piling up on top of one another and communicating through their respective inlet and outlet holes is shown in FIG. 10.

Figure 10:
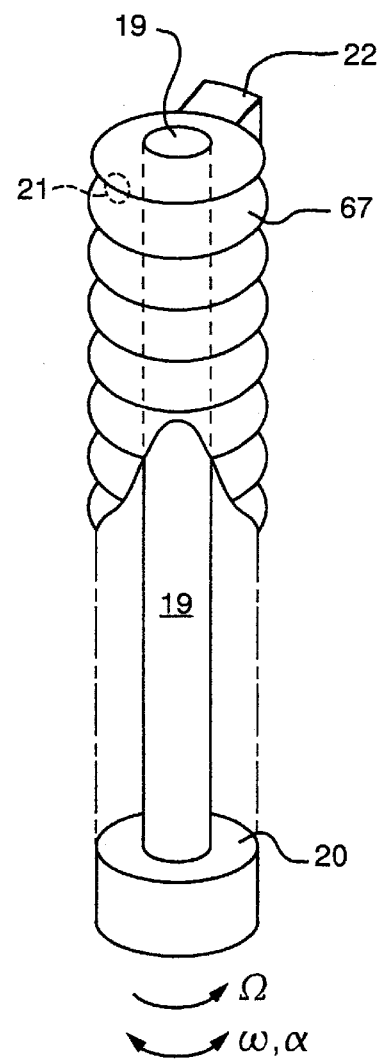
FIG. 10 is a schematic illustration of one embodiment of the disentanglement apparatus designed in accordance with the present invention wherein the feeder is an extruder and/or a plunger, the disentanglement treatment occurs in a series of superposed and interconnected ring stations defined by a tubular track through which trains of submarine-shaped wagons circulate at controlled speed, and the accumulator of the last ring station is connected to a pelletizer line and/or the feed of an extruder or injection molding equipment.

FIG. 10 is a schematic illustration of one embodiment of the disentanglement apparatus designed in accordance with the present invention wherein the feeder is an extruder and/or a plunger feeding molten moldable material in 21 of the first torus ring, the disentanglement treatment occurs in each of a series of superposed and interconnected ring stations 17 defined by a tubular track through which a train of ovally-shaped wagons 16 circulate at controlled speed, driven by a common core cylinder 19, attached to the wagons. The molten moldable material is treated according to the present invention, as described in FIG. 9, and exits a ring station in 22 which directly connects with the inlet of the ring station located under it. At each station, the temperature is adapted to account for the change in viscosity produced by disentanglement. At the bottom of the column in FIG. 10, the outlet of the last ring is connected to an accumulator 20 which is itself connected to a pelletizer line and/or the feed of an extruder or injection molding equipment (not shown).

Figure 11:
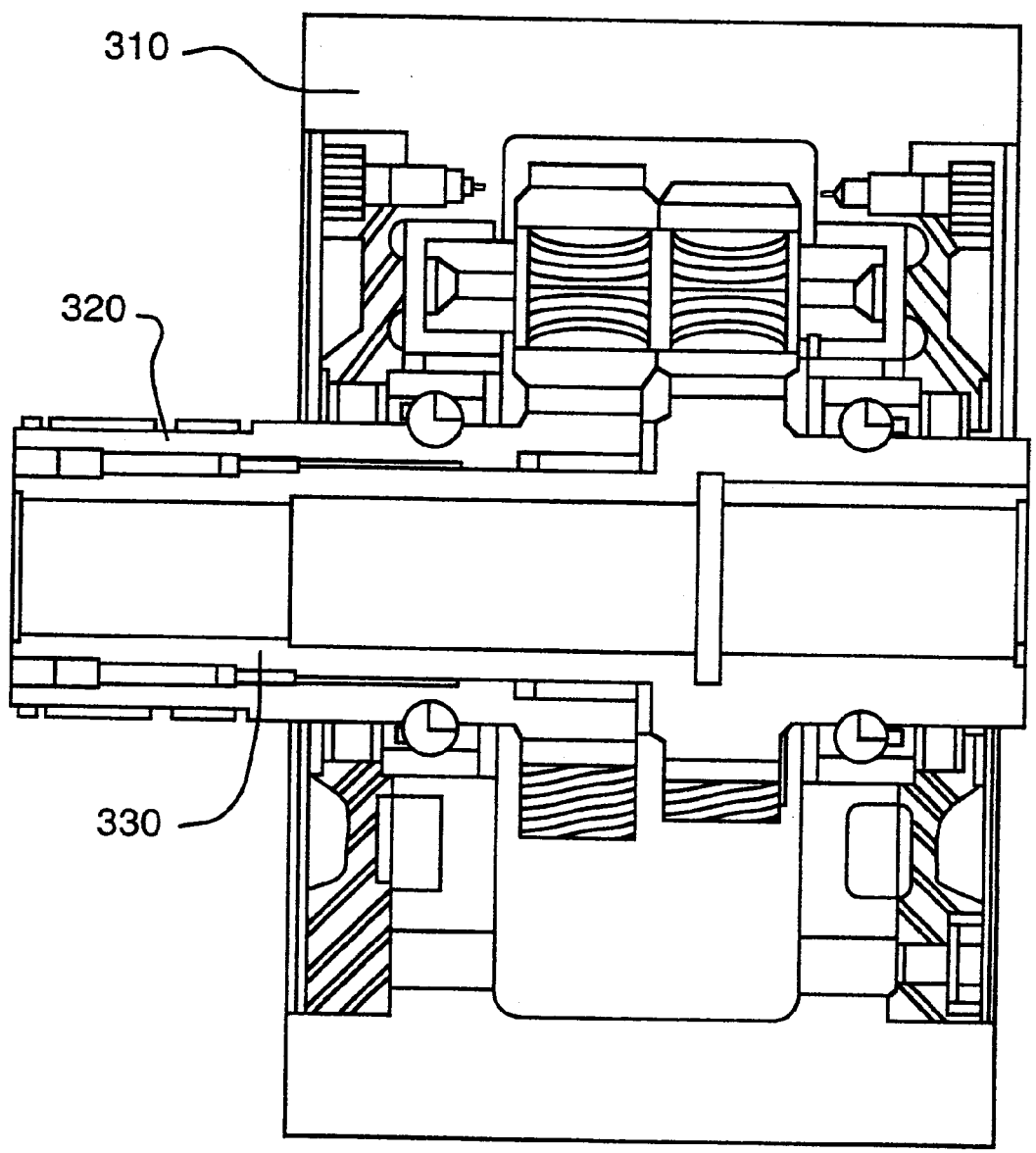
FIG. 11 is a schematic illustration of one embodiment of the power transmission of the disentanglement apparatus designed in accordance with the present invention wherein the shear vibration and the controlled extensional fatigue of the molten moldable material in the treatment cavity are applied on both axes of an epicyclycloidal differential.

FIG. 11 is a schematic illustration of one embodiment of the power transmission of the disentanglement apparatus designed in accordance with the present invention wherein the shear vibration and the controlled extensional fatigue of the molten moldable material in the treatment cavity are applied on both axes 310 and 320 of an epicyclycloidal differential. An epicyclic differential is composed of 3 principle elements: (a) the case planet carrier 310; (b) the torque arm sleeve sun gear 320; and c) the central bore sun gear 330. These 3 elements are mechanically connected by the sun and planet gears which make up the epicyclic differential gear train.

The shaft attached to the surface to rotate and/or oscillate in the treatment station of the present invention, goes into 330. The Willis formula establishes the relationship between the rotational speeds of the 3 elements 310, 320 and 330, allowing to combine at 330 the motions which are imposed, independently, at 310 and 320:

$$N_3 = \rho N_2 + N_1/K$$

where N1 is the rotational speed of the case 310, N2 is the instantaneous rotational speed of the torque arm sleeve motion 320, and N3 is the rotational speed found for the motion of the central bore 330. $\rho$ is the internal ratio between the torque arm sleeve 320 and the central bore 330, i.e. when there is no rotation on the 310 axis (the case is maintained fixed). Likewise, K in Willis equation is the reduction ratio between the case 310 and the central bore 330, i.e. when there is no rotary oscillation on N2.

Specifically, a rotary vibration motion can be set at 320 and a pure rotation with given controllable speed of rotation at 310. The motions on axes 310 and 320 are totally independent and can be programmed separately. The combination of motions 310 and 320 arises naturally at 330 with no or minimum backlash. According to one embodiment of the present invention, an epicyclic differential can replace the gear box which connects the motor of an extruder and the shaft driving the screw. This replacement allows to simultaneously rotate and oscillate such a shaft as disclosed in FIGS. 3 or 4 which is introduced in the barrel, provided the other axis of the epicyclic differential is driven by a rotary vibrating device.

Figure 12A:
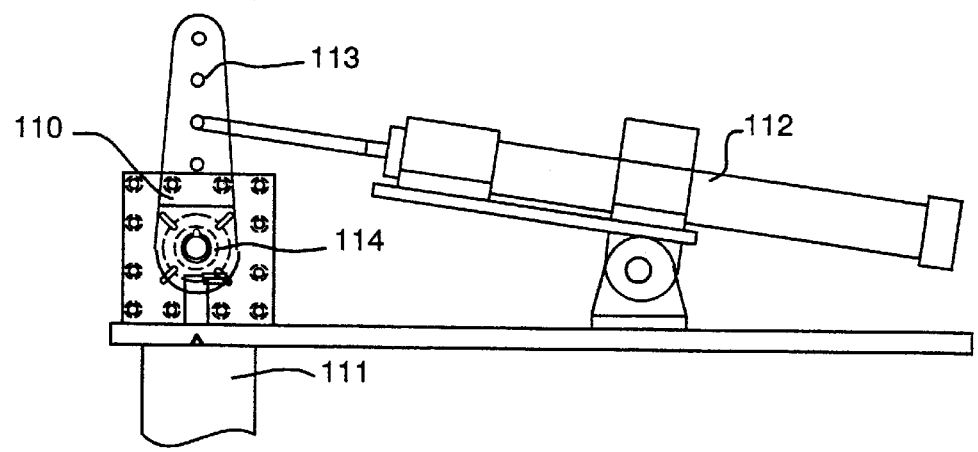
FIG. 12A is a schematic end view illustration of one embodiment of the shear vibration transmission of the disentanglement apparatus designed in accordance with the present invention wherein the shear vibration in the molten moldable material in the treatment cavity is created by the oscillation of the inner cone of a concentric conical assembly attached to one axis of an epicyclycloidal differential, the rotary oscillation being created through a cam and a piston.
Figure 12B:
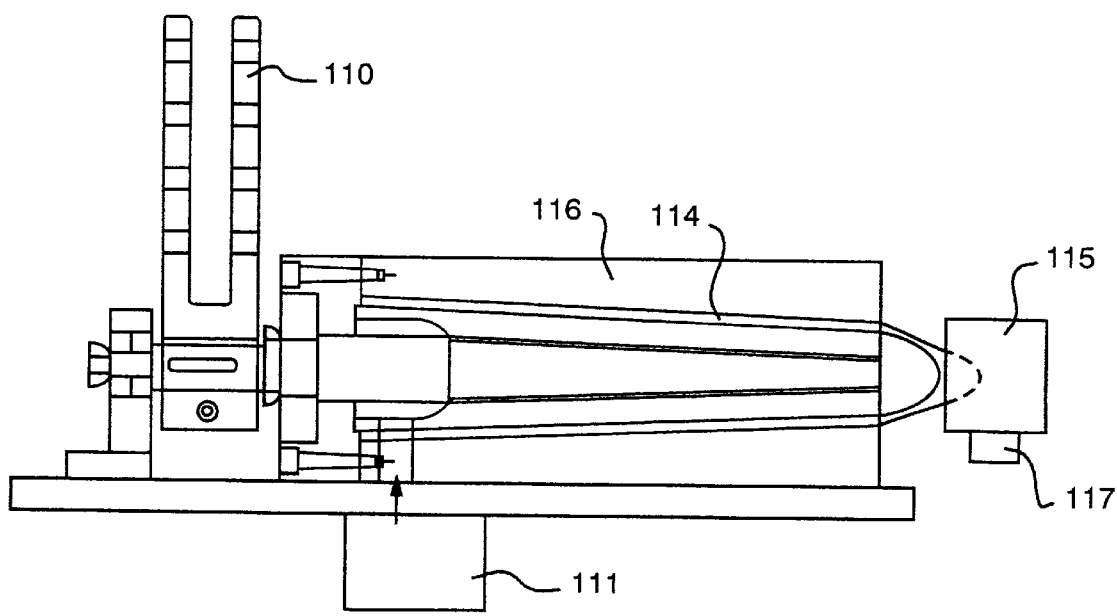
FIG. 12B is a side view of FIG. 12A.

FIG. 12 is a schematic illustration of one embodiment of the shear vibration transmission of the disentanglement apparatus designed in accordance with the present invention wherein the shear vibration in the molten moldable material in the treatment cavity is created by the oscillation of the inner cone of a concentric conical assembly 114 attached to one axis of an epicyclycloidal differential, the rotary oscillation being created through a cam 110 and a piston 112. In this embodiment, the treatment cavity is a pair of concentric cones, such as disclosed in FIG. 4, with a constant gap clearance 114 where the molten moldable material (which fills 114) is sheared and oscillated back and forth through handle 110 activated by a piston 112. Frame 116 includes the heating/cooling jacket filled with thermal fluid and the thermocouple to control the temperature. The clearance gap between the two cones can be adjusted at the beginning of the operation between 0.5 mm and 5 mm. Once adjusted it remains constant throughout the treatment. The piston arm can be attached to the handle 110 at different level positions 113, which allows to modify the amplitude of the shear rotational vibration along with the torque available. The piston displacement can also be varied, which allows another degree of freedom to modify the amplitude of rotation of the rotary oscillation. The molten moldable material is entered in the apparatus through an extruder and gear pump shown as 111, and is pulled out of the cone assembly through another gear pump 115. In this particular embodiment, the gear pump at the outlet recirculates the throughput back to inlet 111 by a separate connection, allowing several passes before the melt is pumped out of the disentanglement apparatus. In this embodiment, the disentangled melt is produced intermittently but in a continuous way. The extruder inlet valve and the outlet valve 117 to the pelletizer unit are both closed while the several passes of molten material through the treatment cavity occur in close circle. When a desired viscosity reduction has been achieved, after several passes, the extruder is signaled to let in a new batch of untreated molten moldable material in the treatment cavity. The gap clearance can be opened wider during this purge to prevent the disentangled melt to be pressurized. The outlet valve 117 to the pelletizer line is kept open and the recirculation outlet valve (not shown) is kept closed during the purge of the treatment cavity. Conversely, those valves are respectively closed and open during the multi-passes treatment.

Figure 13:
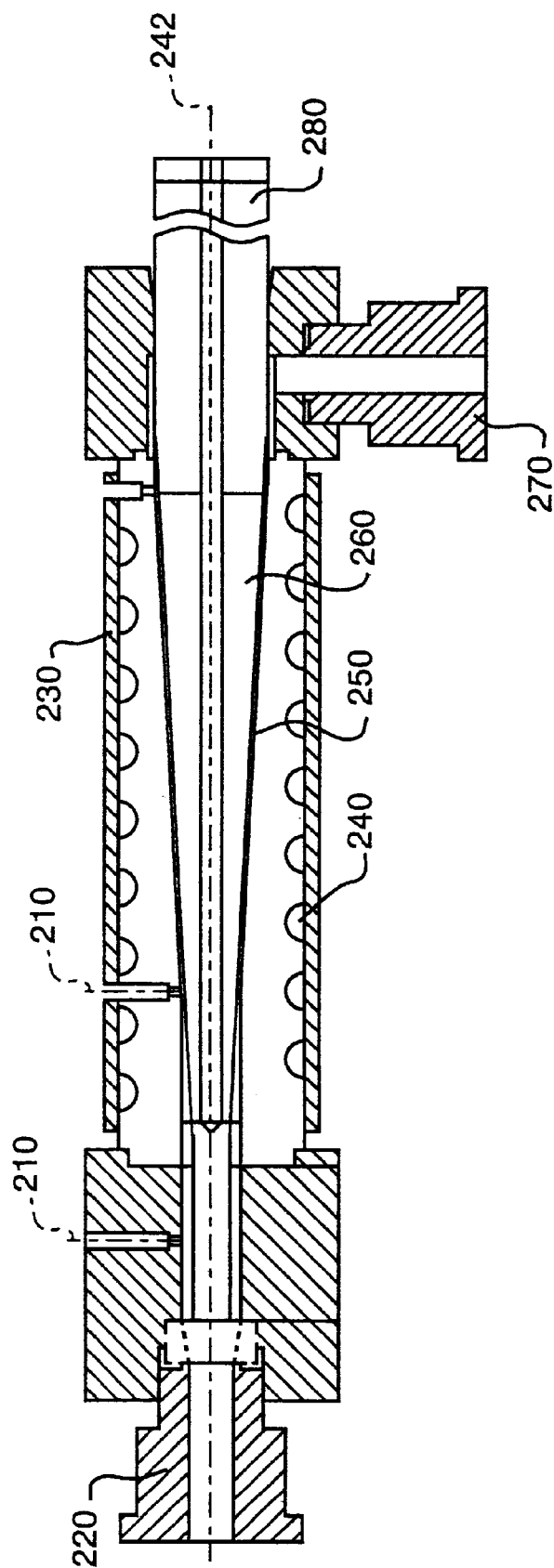
FIG. 13 is a schematic illustration of one embodiment of the treatment cavity of the disentanglement apparatus designed in accordance with the present invention wherein the shear vibration under extensional flow in the molten moldable material is created by the relative motion of two concentric conic surfaces at constant speed or at a modulated speed, or at a combined constant and modulated speed, while the molten moldable material is pushed and/or dragged and/or pumped from the inlet conduit to the outlet conduit of the treatment cavity.

FIG. 13 is a schematic illustration of one embodiment of the treatment cavity of the disentanglement apparatus designed in accordance with the present invention wherein the shear vibration under extensional flow in the molten moldable material is created by the relative motion of two concentric conic surfaces at constant speed or at a modulated speed, i.e. combined constant and vibrated speed, or under pure rotary oscillation while the molten moldable material is pushed and/or dragged and/or pumped from the inlet conduit 220 to the outlet conduit 270 of the treatment cavity (FIG. 13). In this embodiment, unlike for the embodiment disclosed in FIG. 12 which applies to an intermittent release of treated molten material, the treatment cavity and its attachments clearly define a station, such as item 24 in FIG. 7, suitable for a continuous disentanglement process. It is clear in FIG. 13 that flanges 220 and 270 are identical, allowing a repeat to other stations of what can be considered standard features in the description of this station. Molten moldable material 250 enters the treatment station through inlet 220, goes through a spider and fills the cavity created by two concentric cones defining a gap. Inlet 220 can be connected to a gear or screw pump. For the first station, as disclosed in FIG. 7, an extruder is used ahead of the gear pump to prepare the molten moldable material and pressurize it to a given value. The inside cone is continued beyond the treatment section 260 to become 280, which is connected to the epicyclic differential with its two independent motion axis, as described in FIG. 11. The molten moldable material 250 is flowing from the inlet 220 to the outlet 270 due to the combination of pressure flow, and the rotation of the inside cone and the presence of tilted ribs on the surface of the inside and outside cones, as explained in FIGS. 4 or 6. While the molten moldable material 250 passes through the gap created by the cones, it disentangles due to the combined action of the rotation and/or oscillation of the inside cone 260 through the shaft 280. The temperature and pressure of the molten moldable material is measured at several places 210 along the pathway from 220 to 270. Band heaters 230 are wrapped around the frame and water passages 240 and 242 are made to cool 250 from both the outside (240) and the inside (242) in order to maintain its temperature precisely controlled. The outlet 270 can be connected to a gear or screw pump. In the case of a gear pump, the rotation speed of the pump is controlled to build the melt pressure back to the value required for the next treatment station. FIG. 7 discloses how to build a full chain of treatment stations, such as the one disclosed in FIG. 13, in order to continuously and economically disentangle a polymer resin.

Figure 14A:
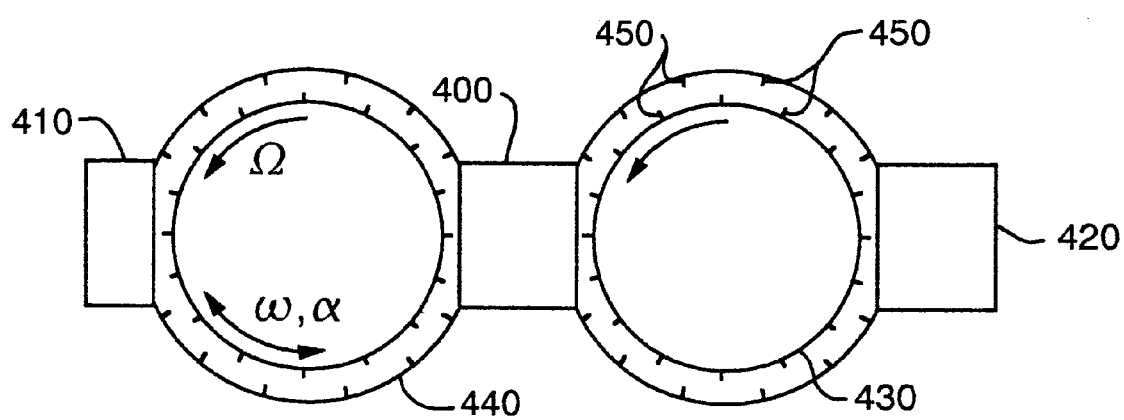
FIG. 14A is a schematic illustration of one embodiment of the disentanglement apparatus designed in accordance with the present invention wherein one or several feeders feed molten moldable material to a series of tubular cavities, intermeshing or not, which themselves connect, directly or through pumping sections, to other series of tubular cavities, so on and so forth until the last series of treatment stations which connects to a collector and a pellitizer line and/or the feed of an extruder or injection molding equipment.
Figure 14B:
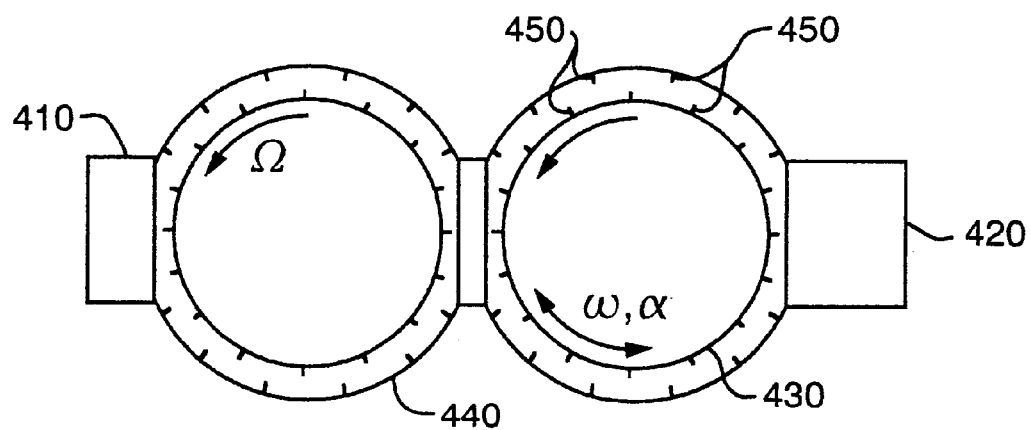
FIG. 14B is a view similar to FIG. 14A, but showing a different mode of operation.

FIGS. 14A and 14B are schematic illustrations of one embodiment of the disentanglement apparatus designed in accordance with the present invention wherein one or several feeders 420 feed molten moldable material to a series of tubular cavities 450, intermeshing or not, which themselves connect, directly (FIG. 14B) or through pumping sections 400, to other series of tubular cavities, until the last array of treatment stations, which connect to a collector 410 and a pellitizer line and/or the feed of an extruder or injection molding equipment (not shown). The surfaces of the tubular cavities are covered with ribs/ bumps and/or grooves 450, designed to synthesize the proper strain rate profile to achieve disentanglement and to drag the molten moldable material forward to the next tubular station and along the axis of the tubular cavities. At least one surface 430 is moving in order to shear the melt under vibration and accomplish the extensional fatigue which are the two requirements to produce disentanglement efficiently. This can be exerted through the rotation of rotor 430 at given rotation speed, or by rotary vibration of rotor 430 at given frequency and amplitude, or by combination of the two previous motions. At the bottom of FIG. 14, the two tubular cavities are positioned to intermesh in their center, along their axis, which is an embodiment useful to apply in the accumulator at the final outlet before the pelletizer line to prevent recovery of the disentanglement.

Figure 15A:
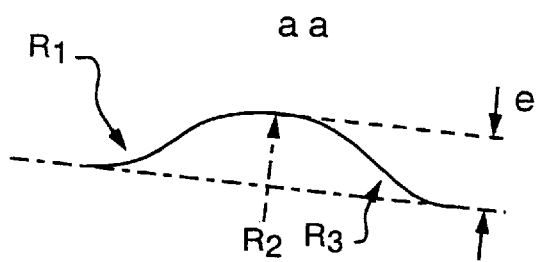
FIGS. 15A, 15B and 15C are schematic illustrations of one embodiment of the treatment cavity of the disentanglement apparatus designed in accordance with the present invention wherein the ribs/bumps on at least one of the surfaces in contact with the molten moldable material have a specific shape to create a given profile of strain rate and strain rate variation under extension, and are aligned in a specific manner with respect to the axis of surface rotation in order to create a certain amount of drag flow.
Figure 15B:
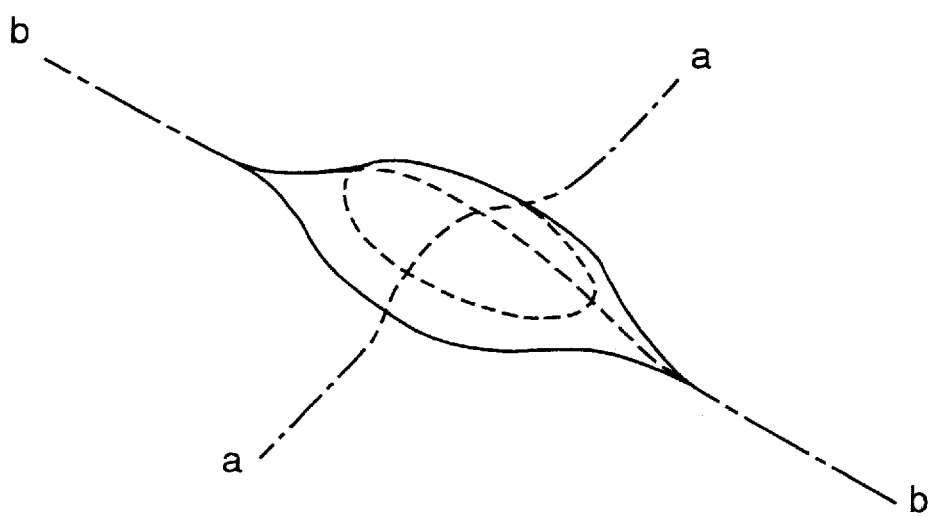
Figure 15C:
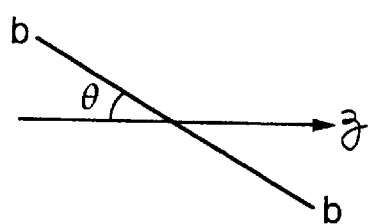

FIGS. 15A to 15C are schematic illustrations of one embodiment of the treatment cavity of the disentanglement apparatus designed in accordance with the present invention wherein the ribs/bumps on at least one of the surfaces in contact with the molten moldable material have a specific shape to create a given profile of strain rate and strainrate variation under extension, and are aligned in a specific manner with respect to the axis of surface rotation in order to create a certain amount of drag flow. FIGS. 15A to 15C define some of the shape parameters and the angle of tilt. The contours of the ribs are calculated to eliminate any possibility of turbulence or other non linear defect in the flow, which should remain laminar. The height of the rib, e, the radius R1, R2 and R3 which define the curvature to accelerate (R1) or decelerate (R3) the flow, can be different along cross sections aa and bb (the cross section bb is not shown here). The strain rate vector decomposes into two components, which defines two directions of drag flow. The shape of the ribs along each axis aa or bb is determined by the strain rate profile desired in these directions. Both profiles can be used to define conditions of shear vibration and/or extensional fatigue which can couple up to optimize disentanglement effects.

While specific embodiments of the invention have been shown and described in detail to illustrate the application of the principles of the invention, it will be understood that the invention may be embodied otherwise without departing from such principles.

What is claimed is:

1. An apparatus for continuously reducing the viscosity of molten moldable polymeric material by shear vibration under extensional flow to cause disentanglement, said apparatus comprising:

(a) at least one station treatment cavity defined by a gap composed of two closely separated surfaces in relative motion with each other at given speed and/or submitted to relative oscillations, with given frequency and amplitude, as to produce a shear deformation on a molten moldable material and a controlled variation of the gap dimension; at least one of said surfaces having on its contour a profile of rib means over which the molten moldable material moves, said treatment cavity comprising an inlet through which the molten moldable material can pass into and an outlet through which it can exit the treatment cavity; said treatment cavity geometry allowing the shear strain and the shear strain rate imposed on the passing molten moldable material to vary controllably;

(b) at least one feeder for preparing a molten moldable material; said feeder including a means for expelling the molten moldable material through its outlet into the station treatment cavity;

(c) at least one accumulator for collecting the treated molten moldable material before it is sent to either a pelletizer system or to a pumping station;

(d) means for exerting a shear vibration of given frequency and amplitude coupled with fatigue extensional flow on the molten moldable material contained within the treatment cavity;

(e) means for varying the amplitude of the shear vibration applied on the molten moldable material;

(f) means for exerting a shear drag at given strain rate of the molten moldable material as it flows through from the inlet to the outlet of the treatment cavity;

(g) said rib means exerting a variation of the shear strain rate of the molten moldable material as it flows through from the inlet to the outlet of the treatment cavity such that it produces extensional acceleration/deceleration of the flow;

(h) means for continuously moving the molten moldable material located in the station treatment cavity from the inlet toward the outlet;

(i) means for monitoring and controlling the temperature of the molten moldable material contained within the at least one feeder and the treatment cavity;

(j) means for monitoring and controlling the pressure of the molten moldable material contained within the at least one feeder; and (k) a means for monitoring and controlling the torque exerted on the molten moldable material contained within the treatment cavity.

2. An apparatus as recited in claim 1 including a plurality of said station treatment cavities connected to one another by gear pumps or screw pumps, said station treatment cavities including a first station cavity connected directly or through a gear pump and/or a static mixer, to an extruder, and a last station treatment cavity connected to the pelletizer system or the pumping station for immediate use of the disentangled melt.

3. An apparatus as recited in claim 1, wherein the rib means comprise at least one of ribs and bumps and grooves, the means for continuously moving the material comprise at least one of means for pushing and dragging and pumping the molten moldable material, the apparatus further including means for controllably varying a dimension of said gap through which the molten moldable material passes.

4. An apparatus according to claim 1, wherein said gap is substantially flat, said closely separated surfaces being flat.

5. An apparatus according to claim 1, wherein said gap is annular.

6. An apparatus according to claim 5, wherein at least one of said two closely separated surfaces is cylindrical.

7. An apparatus according to claim 5, wherein at least one of said two closely separated surfaces is conical.

8. An apparatus according to claim 1, wherein said rib means comprises spaced apart ribs which have a spacing pitch selected so that a stress field caused by one rib in the molten material overlaps a stress field caused by an adjacent rib in the molten material.

9. An apparatus according to claim 8, wherein said ribs extend at least one of radially, axially, circumferentially and helically.

10. An apparatus according to claim 9, wherein said ribs are continuous.

11. An apparatus according to claim 9, wherein said ribs are interrupted.

12. An apparatus according to claim 8, wherein said ribs vary in at least one dimension along the at least one of said two closely separated surfaces.

13. An apparatus according to claim 8, wherein said ribs are V-shaped.

14. An apparatus according to claim 1, wherein the gap is annular and has a radius that changes at least once between the inlet and the outlet of the treatment cavity.

15. An apparatus according to claim 1, wherein said rib means comprises a plurality of spaced apart bumps on one of said two closely separated surfaces.

16. An apparatus according to claim 15, wherein said bumps are polygonal.

17. An apparatus according to claim 15, wherein said bumps have a rounded contour selected to eliminate turbulence of molten material moving past said bumps.

18. An apparatus according to claim 1, wherein said gap and said treatment cavity is formed between a plurality of outer rotors which are rotatable against each other to form an inner space, and an inner rotor rotatable in the inner space, the inner rotor carrying said rib means.

19. An apparatus according to claim 1, wherein said gap and said treatment cavity is formed by an outer torroidal housing, an inner rotor and a series of oblong members connected to each other and to the rotor and rotatable in the torroidal housing.

20. An apparatus according to claim 1, wherein said gap and said treatment cavity comprise a pair of housings connected to each other by a pump and a rotor rotatable in each housing defining the gap between each rotor and its respective housing.

21. An apparatus according to claim 1, including means for continuously venting the treatment cavity to prevent formation of bubbles or cavitation during treatment of the molten moldable material in the treatment cavity.

22. An apparatus according to claim 1, wherein said rib means have dimensions and relative spacings selected so that an extensional acceleration/deceleration of the molten material at a given frequency is a function of the rheology of the molten material.

23. An apparatus according to claim 1, wherein said rib means are tilted with respect to the relative movement between the surfaces so that the molten material is dragged along the surfaces at a selected rate.

24. An apparatus according to claim 1, wherein the at least one accumulator includes means for maintaining disentanglement of the molten material.

25. An apparatus according to claim 1, including a moveable member in said at least one station treatment cavity which defines one of said closely separated surfaces, said gap being formed on both sides of said member.

* * * * *